United States Patent
Mori et al.

(10) Patent No.: US 12,503,621 B2
(45) Date of Patent: Dec. 23, 2025

(54) COATING COMPOSITION AND METHOD FOR FORMING MULTILAYER COATING FILM

(71) Applicant: KANSAI PAINT CO., LTD., Hyogo (JP)

(72) Inventors: Kenji Mori, Kanagawa (JP); Tatsuya Azuma, Kanagawa (JP); Takahiro Hidaka, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 722 days.

(21) Appl. No.: 17/788,836

(22) PCT Filed: Nov. 19, 2020

(86) PCT No.: PCT/JP2020/043267
§ 371 (c)(1),
(2) Date: Jun. 24, 2022

(87) PCT Pub. No.: WO2021/131444
PCT Pub. Date: Jul. 1, 2021

(65) Prior Publication Data
US 2023/0063826 A1    Mar. 2, 2023

(30) Foreign Application Priority Data

Dec. 26, 2019 (JP) ................................. 2019-236663

(51) Int. Cl.
| | |
|---|---|
| *C09D 183/06* | (2006.01) |
| *B05D 7/00* | (2006.01) |
| *C09D 7/62* | (2018.01) |
| *C09D 7/63* | (2018.01) |

(52) U.S. Cl.
CPC ............. *C09D 183/06* (2013.01); *B05D 7/53* (2013.01); *C09D 7/62* (2018.01); *C09D 7/63* (2018.01); *B05D 2451/00* (2013.01); *B05D 2518/10* (2013.01)

(58) Field of Classification Search
CPC .. C09D 201/10; C09D 183/06; C09D 175/04; C09D 133/066; C08F 230/085; C08F 220/20; C08F 220/1804; C08F 212/08; C08F 292/00; C08G 18/6295; C08K 9/06; C08K 9/08; B05D 2425/01; B05D 2518/10; B05D 2518/12; B05D 2601/22; C08L 43/04
See application file for complete search history.

(56) References Cited

U.S. PATENT DOCUMENTS

| | | | | |
|---|---|---|---|---|
| 5,889,115 | A * | 3/1999 | Yabuta | C09D 143/04 525/208 |
| 10,472,537 | B2 * | 11/2019 | Watanabe | C09D 133/10 |
| 2018/0265730 | A1 * | 9/2018 | Watanabe | C09D 133/10 |
| 2022/0010121 | A1 | 1/2022 | Kato | |

FOREIGN PATENT DOCUMENTS

| | | | | |
|---|---|---|---|---|
| CN | 114746523 B * | 2/2023 | | C08K 9/06 |
| JP | 11/241047 A | 9/1999 | | |
| JP | 2001-316630 A | 11/2001 | | |
| JP | 2008/127424 A | 6/2008 | | |
| JP | 2010/144009 A | 7/2010 | | |
| JP | 5946356 B2 | 7/2016 | | |
| JP | 2018/58944 A | 4/2018 | | |
| JP | 6918273 B1 * | 8/2021 | | C09C 1/3072 |
| WO | WO-2017056911 A1 * | 4/2017 | | B05D 7/24 |
| WO | WO-2020/203063 A1 | 10/2020 | | |

OTHER PUBLICATIONS

International Search Report for PCT/JP2020/043267 dated Feb. 2, 2021.

* cited by examiner

*Primary Examiner* — Sophie Hon
(74) *Attorney, Agent, or Firm* — Marshall, Gerstein & Borun LLP

(57) ABSTRACT

Provided is a coating composition from which a coating film having excellent decontamination properties, scratch resistance, and transparency can be formed. Specifically, provided is a coating composition containing a resin (A) having a hydroxyl group and an alkoxysilyl group, a curing agent (B), and an acrylic resin-coated silica particle (C) dispersion, wherein: the acrylic resin-coated silica particle (C) dispersion is a reaction product of silica particles with a polymerizable unsaturated group (c1) and a polymerizable unsaturated monomer mixture (c2); and the polymerizable unsaturated monomer mixture (c2) contains, as at least a part of components thereof, a polymerizable unsaturated monomer having a polysiloxane structure (c21) and an alkoxysilyl group-containing polymerizable unsaturated monomer (c22).

10 Claims, No Drawings

COATING COMPOSITION AND METHOD FOR FORMING MULTILAYER COATING FILM

CROSS REFERENCE TO RELATED APPLICATIONS

This application is a U.S. national stage of International Application No. PCT/JP2020/043267, filed Nov. 19, 2020, which claims the benefit of Japanese Patent Application No. 2019-236663, filed Dec. 26, 2019, the entire contents of each of which are fully incorporated herein by reference.

FIELD

The invention relates to a coating composition and to a method for forming a multilayer coating film.

BACKGROUND

Coating materials applied onto articles to be coated such as automobile bodies, trucks, motorcycles, buses, automobile parts, railway vehicles, industrial machinery, buildings and structures are required to have excellent film performance including scratch resistance, as well as excellent coated film appearance including coating film transparency. In recent years demand has also arisen for decontamination properties, which allow easy removal of graffiti that has been written onto such articles using oil-based inks.

PTL 1, for example, discloses a composition for coating that comprises a flatting agent (A) comprising organic fine particles dispersed in an organic solvent, a copolymer (B) having an organosiloxane chain as the main chain or a side chain, and a fluorine resin (C), which produces a coated film appearance with reduced luster and excellent decontamination properties against lacquers and oil-based inks.

PTL 2 discloses a coating composition comprising a hydroxyl group-containing resin (A), a curing agent (B) and a dispersion of acrylic resin-coated silica particles (C), the dispersion of acrylic resin-coated silica particles (C) being an acrylic resin-coated silica particle dispersion obtained by reacting silica particles with a polymerizable unsaturated group (c1) and a polymerizable unsaturated monomer (c2) in a mass ratio of (c1):(c2)=20:80 to 90:10, the polymerizable unsaturated monomer (c2) including a specific polymerizable unsaturated monomer (c2-1) with a siloxane bond as at least a portion of its components, and the molecular weight of the resin covering the silica particles being 400 to 6000, wherein the coating composition has excellent storage stability and excellent scratch resistance of the obtained coating film.

CITATION LIST

Patent Literature

[PTL 1] Japanese Unexamined Patent Publication No. 2008-127424
[PTL 2] Domestic Re-publication of International Application 2017-56911

SUMMARY

Technical Problem

With the composition for coating described in PTL 1 it is not possible to form coating films with high gloss, and the scratch resistance and transparency of obtained coating films have also been insufficient.

With the composition for coating described in PTL 2, the decontamination properties of obtained coating films have been unsatisfactory. The scratch resistance and transparency of obtained coating films have also been insufficient in some cases.

The problem to be solved by the invention is to provide a coating composition that can form coating films with excellent decontamination properties, scratch resistance and transparency.

Solution to Problem

As a result of much diligent research directed toward solving the problems mentioned above, the present inventors have completed this invention upon finding that the problems can be solved by a coating composition comprising a resin with a hydroxyl group and an alkoxysilyl group (A), a curing agent (B) and a dispersion of specific acrylic resin-coated silica particles (C).

Specifically, the invention relates to a coating composition and a method for forming a multilayer coating film, and includes the following aspects <1> to <11>.

<1> A coating composition comprising a resin with a hydroxyl group and an alkoxysilyl group (A), a curing agent (B) and a dispersion of acrylic resin-coated silica particles (C), wherein the dispersion of acrylic resin-coated silica particles (C) is a dispersion of acrylic resin-coated silica particles (C) that is the reaction product of silica particles with a polymerizable unsaturated group (c1) and a polymerizable unsaturated monomer mixture (c2), and the polymerizable unsaturated monomer mixture (c2) includes, as at least a portion of its components, a polymerizable unsaturated monomer having a polysiloxane structure (c21) represented by the following formula (I):

[Chemical Formula 1]

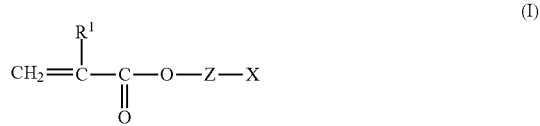

(wherein $R^1$ represents a hydrogen atom or a methyl group, Z represents a structure including the following formula (II), and X represents a hydrogen atom or a (meth)acryloyl, alkyl, hydroxyl, amino, (alicyclic) epoxy, carboxyl, mercapto, vinyl, isocyanate or aryl group),

[Chemical Formula 2]

(wherein m represents a number of 2 to 160, $R^2$ represent phenyl groups or alkyl groups of 1 to 6 carbon atoms, which may be the same or different, and $R^3$ represents an alkylene group of 1 to 6 carbon atoms),
and an alkoxysilyl group-containing polymerizable unsaturated monomer (c22).

<2> The coating composition according to <1>, wherein the polymerizable unsaturated monomer mixture (c2) comprises a hydroxyl group-containing polymerizable unsaturated monomer.

<3> The coating composition according to <1> or <2>, wherein the number-average molecular weight of the polymerizable unsaturated monomer having a polysiloxane structure (c21) is in the range of 100 to 13,000.

<4> The coating composition according to any one of <1> to <3>, wherein the proportion of the alkoxysilyl group-containing polymerizable unsaturated monomer (c22) in the polymerizable unsaturated monomer mixture (c2) is in the range of 5 to 60 mass % with respect to the total amount of the polymerizable unsaturated monomer mixture (c2).

<5> The coating composition according to any one of <2> to <4>, wherein the hydroxyl value of the acrylic resin produced from the polymerizable unsaturated monomer mixture (c2) is in the range of 120 to 200 mgKOH/g.

<6> The coating composition according to any one of <1> to <5>, wherein the mass ratio of the silica particles with a polymerizable unsaturated group (c1) and the polymerizable unsaturated monomer mixture (c2) is in the range of (c1): (c2)=20/80 to 90/10.

<7> The coating composition according to any one of <1> to <6>, wherein the dispersion of the acrylic resin-coated silica particles (C) comprises trimethyl orthoacetate.

<8> The coating composition according to any one of <1> to <7>, wherein the curing agent (B) includes a polyisocyanate compound (B1).

<9> The coating composition according to any one of <1> to <8>, wherein the resin with a hydroxyl group and an alkoxysilyl group (A) includes an acrylic resin having a hydroxyl group and an alkoxysilyl group (A1).

<10> The coating composition according to any one of <1> to <9>, wherein the resin with a hydroxyl group and an alkoxysilyl group (A) does not have a polydimethylsiloxane structure.

<11> A method for forming a multilayer coating film, whereby a multilayer coating film is formed by applying at least one colored base coating material and at least one clear coating material in that order on an article to be coated, wherein a coating composition according to any one of <1> to <10> is applied as the uppermost clear coating material.

Advantageous Effects of Invention

The coating composition of the invention allows formation of coating films with excellent decontamination properties, scratch resistance and transparency.

DESCRIPTION OF EMBODIMENTS

The present invention will now be described in detail. The coating composition of the invention (hereunder also referred to simply as "the present coating material") is a coating composition comprising a resin with a hydroxyl group and an alkoxysilyl group (A), a curing agent (B) and a dispersion of acrylic resin-coated silica particles (C), the dispersion of acrylic resin-coated silica particles (C) being a dispersion of acrylic resin-coated silica particles (C) that is the reaction product of silica particles with a polymerizable unsaturated group (c1) and a polymerizable unsaturated monomer mixture (c2), and the polymerizable unsaturated monomer mixture (c2) including a polymerizable unsaturated monomer having a polysiloxane structure (c21) and an alkoxysilyl group-containing polymerizable unsaturated monomer (c22) as at least a portion of its components. Each of the components will now be explained in greater detail.

Resin with a Hydroxyl Group and an Alkoxysilyl Group (A)

The resin with a hydroxyl group and an alkoxysilyl group (A) is not particularly restricted so long as it has a hydroxyl group and an alkoxysilyl group, and any one publicly known as a thermosetting resin may be used. Examples include alkyd resins, polyester resins, acrylic resins and cellulose resins, with an acrylic resin having a hydroxyl group and an alkoxysilyl group (A1) being preferred from the viewpoint of weather resistance and scratch resistance of the coating film.

Acrylic Resin having a Hydroxyl Group and an Alkoxysilyl Group (A1)

The acrylic resin having a hydroxyl group and an alkoxysilyl group (A1) can be produced by copolymerizing a hydroxyl group-containing polymerizable unsaturated monomer (a11), an alkoxysilyl group-containing polymerizable unsaturated monomer (a12) and another copolymerizable polymerizable unsaturated monomer (a13).

The hydroxyl group-containing polymerizable unsaturated monomer (a11) is a compound having one or more hydroxyl groups and one or more polymerizable unsaturated groups in the molecule.

Throughout the present specification, the term "polymerizable unsaturated group" means an unsaturated group that can participate in radical polymerization. Examples of such polymerizable unsaturated groups include vinyl and (meth)acryloyl.

The hydroxyl group of the hydroxyl group-containing polymerizable unsaturated monomer (a11) can function as a crosslinkable functional group in the obtained acrylic resin having a hydroxyl group and an alkoxysilyl group (A1).

Specifically preferred for the hydroxyl group-containing polymerizable unsaturated monomer (a11) are monoesters of acrylic acid or methacrylic acid with dihydric alcohols of 2 to 10 carbon atoms, examples of which include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, caprolactone-modified hydroxyl group-containing (meth)acrylate and 4-methylolcyclohexyl (meth)acrylate. An example of a commercially available caprolactone-modified hydroxyl group-containing (meth)acrylate is "PLACCEL FM" (trade name of Dicel Chemical Industries, Ltd.), and an example of a commercially available 4-methylolcyclohexyl acrylate is "CHDMMA" (trade name of Nippon Kasei Chemical Co., Ltd.).

Throughout the present specification, "(meth)acrylate" means "acrylate or methacrylate". The term "(meth)acrylic acid" means "acrylic acid or methacrylic acid". The term "(meth)acryloyl" means "acryloyl or methacryloyl". The term "(meth)acrylamide" means "acrylamide or methacrylamide".

From the viewpoint of scratch resistance of the formed coating film, the hydroxyl group-containing polymerizable unsaturated monomer (a11) is most preferably a polymerizable unsaturated monomer having a hydroxyl group-containing hydrocarbon group of 2 to 20 carbon atoms, and specifically 2-hydroxyethyl (meth)acrylate, 2-hydroxypropyl (meth)acrylate, 4-hydroxybutyl (meth)acrylate and 4-methylolcyclohexyl acrylate are preferred.

The alkoxysilyl group-containing polymerizable unsaturated monomer (a12) is a compound having one or more alkoxysilyl groups and one or more polymerizable unsaturated groups in the molecule.

Specific examples for the alkoxysilyl group-containing polymerizable unsaturated monomer (a12) include vinyltrimethoxysilane, vinyltriethoxysilane, acryloxyethyltrimethoxysilane, methacryloxyethyltrimethoxysilane, acryloxypropyltrimethoxysilane, methacryloxypropyltrimethoxysilane, acryloxypropyltriethoxysilane, methacryloxypropyltriethoxysilane and vinyltris(β-methoxyethoxy)silane. Preferred alkoxysilyl group-containing polymerizable unsaturated monomers among these are vinyltrimethoxysilane, γ-acryloxypropyltrimethoxysilane and γ-methacryloxypropyltrimethoxysilane.

The other copolymerizable polymerizable unsaturated monomer (a13) is a compound having one or more polymerizable unsaturated groups per molecule, other than the aforementioned hydroxyl group-containing polymerizable unsaturated monomer (a11) and alkoxysilyl group-containing polymerizable unsaturated monomer (a12), and specific examples thereof are listed as (1) to (11) below.

(1) Aromatic polymerizable unsaturated monomers: Examples include styrene, α-methylstyrene and vinyltoluene.

(2) Polymerizable unsaturated monomers with hydrocarbon groups of 8 or more carbon atoms, having a branched structure: Examples include 2-ethylhexyl (meth)acrylate, isooctyl (meth)acrylate, isomyristyl (meth)acrylate and isostearyl (meth)acrylate. A commercially available product is "Isostearyl Acrylate" (trade name of Osaka Organic Chemical Industry, Ltd.).

(3) Polymerizable unsaturated monomers with alicyclic hydrocarbon groups of 3 to 20 carbon atoms: Examples include polymerizable unsaturated monomers with cross-linked alicyclic hydrocarbon groups of 10 to 20 carbon atoms, such as isobornyl (meth)acrylate, tricyclodecanyl (meth)acrylate, adamantyl (meth)acrylate, 3,5-dimethyladamantyl (meth)acrylate and 3-tetracyclododecyl (meth)acrylate; and polymerizable unsaturated monomers with alicyclic hydrocarbon groups of 3 to 12 carbon atoms such as cyclohexyl (meth)acrylate, 4-methylcyclohexylmethyl (meth)acrylate, 4-ethylcyclohexylmethyl (meth)acrylate, 4-methoxycyclohexylmethyl (meth)acrylate, t-butylcyclohexyl (meth)acrylate, cyclooctyl (meth)acrylate, cyclododecyl (meth)acrylate and tetrahydrofurfuryl (meth)acrylate.

(4) C1-7 Straight-chain or branched alkyl esters of (meth)acrylic acid: Methyl (meth)acrylate, ethyl (meth)acrylate, propyl (meth)acrylate, isopropyl (meth)acrylate, butyl (meth)acrylate, isobutyl (meth)acrylate and t-butyl (meth)acrylate.

(5) C8 to 22 straight-chain alkyl esters of (meth)acrylic acid: Examples include lauryl (meth)acrylate and stearyl (meth)acrylate.

(6) Epoxy group-containing polymerizable unsaturated monomers: Examples include glycidyl (meth)acrylate.

(7) Nitrogen-containing polymerizable unsaturated monomers: Examples include (meth)acrylamide, N,N-dimethylaminoethyl (meth)acrylate, vinylpyridine and vinylimidazole.

(8) Other vinyl compounds: Examples include vinyl acetate, vinyl propionate, vinyl chloride, vinylidene chloride, divinyl ether, and the vinyl versatate esters "VEOVA 9" and "VEOVA 10" (trade names of Hexion Co., Ltd.).

(9) Unsaturated group-containing nitrile compounds: Examples include (meth)acrylonitrile.

(10) Acidic functional group-containing polymerizable unsaturated monomers: Examples include carboxyl group-containing unsaturated monomers such as (meth)acrylic acid, crotonic acid, itaconic acid, maleic acid and maleic anhydride; sulfonic acid group-containing unsaturated monomers such as vinylsulfonic acid and sulfoethyl (meth)acrylate; and acidic phosphoric acid ester-based unsaturated monomers such as 2-(meth)acryloyloxyethyl acid phosphate, 2-(meth)acryloyloxypropyl acid phosphate, 2-(meth)acryloyloxy-3-chloropropyl acid phosphate and 2-(meth)acryloyloxyethylphenylphosphoric acid.

(11) Polymerizable unsaturated monomers with a polydimethylsiloxane structure: Examples include the commercial products "SILAPLANE FM-0721", "SILAPLANE FM-0711" and "SILAPLANE FM-0725" (all trade names of JNC Co.), and "X-22-174ASX", "X-22-174BX", "KF-2012", "X-22-2426", "X-22-2404" and "X-22-2475" (all trade names of Shin-Etsu Chemical Co., Ltd.).

The other polymerizable unsaturated monomer (a13) that is copolymerizable may be a single one alone or a combination of two or more.

The acrylic resin having a hydroxyl group and an alkoxysilyl group (A1) can be obtained by copolymerizing a polymerizable unsaturated monomer mixture comprising the hydroxyl group-containing polymerizable unsaturated monomer (a11), the alkoxysilyl group-containing polymerizable unsaturated monomer (a12) and the other copolymerizable polymerizable unsaturated monomer (a13).

The proportion of the hydroxyl group-containing polymerizable unsaturated monomer (a11) used is suitably 15 to 55 mass % and preferably 20 to 50 mass % based on the total mass of the copolymerized monomer component in the acrylic resin having a hydroxyl group and an alkoxysilyl group (A1), from the viewpoint of the decontamination properties, scratch resistance and water resistance of the obtained coating film.

The proportion of the alkoxysilyl group-containing polymerizable unsaturated monomer (a12) used is suitably 5 to 60 mass % and preferably 20 to 50 mass % based on the total mass of the copolymerized monomer component in the acrylic resin having a hydroxyl group and an alkoxysilyl group (A1), from the viewpoint of the decontamination properties, scratch resistance and transparency of the obtained coating film.

From the viewpoint of the decontamination properties and scratch resistance of the obtained coating film, the amount of a polymerizable unsaturated monomer (11) with a polydimethylsiloxane structure that is used as the other polymerizable unsaturated monomer (a13) is preferably small or zero, and more preferably it is zero. Specifically, the proportion for its use is suitably 0 to 5 mass %, preferably 0 to 1 mass % and more preferably zero based on the total mass of the copolymerized monomer component composing the acrylic resin having a hydroxyl group and an alkoxysilyl group (A1).

For the other polymerizable unsaturated monomer (a13), acidic functional group-containing polymerizable unsaturated monomers such as carboxyl group-containing unsaturated monomers, sulfonic acid group-containing unsaturated monomers and acidic phosphoric acid ester-based unsaturated monomers may be used as internal catalysts during the crosslinking reaction of the obtained acrylic resin having a hydroxyl group and an alkoxysilyl group (A1), with a polyisocyanate compound, in which case they are preferably used in amounts in the range of preferably about 0 to 5 mass % and more preferably about 0 to 3 mass %, based on the total amount of the monomer mixture composing the resin.

The method of copolymerizing the monomer mixture to obtain the acrylic resin having a hydroxyl group and an alkoxysilyl group (A1) is not particularly restricted, and any publicly known copolymerization method may be used. It is most preferred to use a solution polymerization method in which polymerization is conducted in an organic solvent in the presence of a polymerization initiator.

Examples of organic solvents to be used in the solution polymerization method include aromatic solvents such as toluene, xylene and high-boiling-point aromatic hydrocarbons; ester-based solvents such as ethyl acetate, butyl acetate, 3-methoxybutyl acetate, ethyleneglycol ethyl ether acetate and propyleneglycol methyl ether acetate; ketone-based solvents such as methyl ethyl ketone, methyl isobutyl ketone and methyl amyl ketone; glycol ether-based solvents such as ethyleneglycol monomethyl ether, ethyleneglycol monoethyl ether, diethyleneglycol monomethyl ether, ethyleneglycol monobutyl ether and propyleneglycol monomethyl ether; alcohol-based organic solvents such as methanol, ethanol, isopropanol, n-butanol and isobutanol; and propyl propionate, butyl propionate, ethoxyethyl propionate, and the like. Examples of commercially available high-boiling-point aromatic hydrocarbons include "SWASOL 1000" (trade name of Cosmo Oil Co., Ltd., high-boiling-point petroleum-based solvent).

Any one of these organic solvents may be used, or two or more may be used in combination. Particularly when the acrylic resin having a hydroxyl group and an alkoxysilyl group (A-1) has a high hydroxyl value, the organic solvent used is preferably a high-boiling-point ester-based solvent or ketone-based solvent, from the viewpoint of solubility of the resin. A high-boiling-point aromatic solvent may also be used in combination with a high-boiling-point ester-based solvent or ketone-based solvent.

Examples of polymerization initiators that may be used for copolymerization of the acrylic resin having a hydroxyl group and an alkoxysilyl group (A1) include publicly known radical polymerization initiators such as 2,2'-azobisisobutyronitrile, benzoyl peroxide, 2,2-di(t-amylperoxy)butane, di-t-butyl peroxide, di-t-amyl peroxide, t-butyl peroctoate and 2,2'-azobis(2-methylbutyronitrile).

The acrylic resin having a hydroxyl group and an alkoxysilyl group (A1) may consist of a single type of copolymer, or it may comprise two or more types of copolymers.

The hydroxyl value of the acrylic resin having a hydroxyl group and an alkoxysilyl group (A1) is preferably in the range of 120 to 200 mgKOH/g, especially 130 to 200 mgKOH/g and most especially 140 to 200 mgKOH/g, from the viewpoint of decontamination properties, scratch resistance and water resistance.

The weight-average molecular weight of the acrylic resin having a hydroxyl group and an alkoxysilyl group (A1) is preferably in the range of 5,000 to 30,000, especially 5,000 to 20,000 and most especially 6,000 to 15,000, from the viewpoint of decontamination properties, scratch resistance and transparency.

As used herein, the weight-average molecular weight and number-average molecular weight are the values calculated from a chromatogram measured by gel permeation chromatography based on the molecular weight of standard polystyrene. An HLC8120GPC apparatus (product of Tosoh Corp.) was used for the gel permeation chromatography. Four columns were used, namely "TSKgel G-4000HXL", "TSKgel G-3000HXL", "TSKgel G-2500HXL" and "TSKgel G-2000HXL" (all trade names of Tosoh Corp.), with the following conditions: mobile phase: tetrahydrofuran, measuring temperature: 40° C., flow rate: 1 mL/min, detector: RI.

The glass transition temperature of the acrylic resin having a hydroxyl group and an alkoxysilyl group (A1) is preferably in the range of −30° C. to 50° C. and especially −10° C. to 40° C., from the viewpoint of decontamination properties, scratch resistance and smoothness.

According to the invention the glass transition temperature Tg is the value calculated by the following formula.

$$1/Tg(K)=W1/T1+W2/T2+ \ldots Wn/Tn$$

$$Tg(°\ C.)=Tg(K)-273$$

In this formula, W1, W2, . . . Wn represents the mass fraction of each of the monomers, and T1, T2 . . . Tn represents the glass transition temperature Tg (K) of homopolymers of each of the monomers.

The glass transition temperature of the homopolymer of each monomer is the value according to POLYMER HANDBOOK Fourth Edition, J. Brandrup, E. H. Immergut, E. A. Grulke, ed. (1999), and the glass transition temperatures of monomers not listed in this publication are the values measured by synthesizing a homopolymer of the monomer to a weight-average molecular weight of about 50,000, and determining the glass transition temperature with a DSC220U by Seiko Instruments, Inc. (differential scanning calorimeter). The measurement was conducted by weighing out 50 mg of sample into a special sample dish and drying it at 130° C. for 3 hours, and then raising the temperature from −50° C. to 150° C. at a speed of 10° C./min in an inert gas and reading out the temperature at the point of inflection of the obtained heat change curve.

Curing Agent (B)

The curing agent (B) used may be a polyisocyanate compound (B1) or an amino resin, for example. The curing agent (B) preferably includes a polyisocyanate compound (B1) from the viewpoint of the decontamination properties, scratch resistance, weather resistance and adhesion of the obtained coating film.

Polyisocyanate Compound (B1)

A polyisocyanate compound (B1) is a compound having two or more isocyanate groups in the molecule.

Specific examples for the polyisocyanate compound (B1) include aliphatic polyisocyanates, alicyclic polyisocyanates, araliphatic polyisocyanates, aromatic polyisocyanates and derivatives of these polyisocyanates.

Examples of aliphatic polyisocyanates include aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate and methyl 2,6-diisocyanatohexanoate (common name: lysine diisocyanate); and aliphatic triisocyanates such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane and 2,5,7-trimethyl-1,8-diisocyanato-5-isocyanatomethyloctane.

Examples of alicyclic polyisocyanates include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or mixtures thereof, methylene bis(4,1-cyclohexanediyl)diisocyanate (common name: hydrogenated MDI) and norbornane diisocyanate; and alicyclic triisocyanates such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1) heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2- isocyanatoethyl) isocyanatomethyl-3-(3-isocyanatopropyl)-bicyclo(2.2.1)heptane, 6-(2-isocyanatoethyl) isocyanatomethyl-3-(3-isocyanatopropyl)-bicyclo(2.2.1) heptane, 5-(2-isocyanatoethyl)-2-isocyanatomethyl-2-(3-isocyanatopropyl)-bicyclo(2.2.1)-heptane and 6-(2-isocyanatoethyl)-2-isocyanatomethyl-2-(3-isocyanatopropyl)-bicyclo(2.2.1)heptane.

Examples of araliphatic polyisocyanates include araliphatic diisocyanates such as methylene bis(4,1-phenylene) diisocyanate (common name: MDI), 1,3- or 1,4-xylylene diisocyanate or mixtures thereof, ω,ω'-diisocyanato-1,4-diethylbenzene and 1,3- or 1,4-bis(1-isocyanato-1-methylethyl)benzene (common name: tetramethylxylylene diisocyanate) or mixtures thereof; and araliphatic triisocyanates such as 1,3,5-triisocyanatomethylbenzene.

Examples of aromatic polyisocyanates include aromatic diisocyanates such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI) or 2,6-tolylene diisocyanate (common name: 2,6-TDI), or mixtures thereof, 4,4'-toluidine diisocyanate and 4,4'-diphenyl ether diisocyanate; aromatic triisocyanates such as triphenylmethane-4,4',4"-triisocyanate, 1,3,5-triisocyanatobenzene and 2,4,6-triisocyanatotoluene; and aromatic tetraisocyanates such as 4,4'-diphenylmethane-2,2',5,5'-tetraisocyanate.

Examples of the aforementioned polyisocyanate derivatives include the aforementioned polyisocyanate dimers, trimers, biurets, allophanates, urethodiones, urethoimines, isocyanurates, oxadiazinetriones and the like, as well as polymethylenepolyphenyl polyisocyanate (crude MDI, polymeric MDI) and crude TDI.

These polyisocyanates and their derivatives may be used alone or in combinations of two or more.

Blocked polyisocyanate compounds wherein the isocyanate groups of a polyisocyanate compound have been blocked may also be used for the polyisocyanate compound (B1). Examples of blocking agents preferred for use include phenol compounds; lactam compounds; alcohol compounds; oxime compounds; mercaptane compounds; and active methylene compounds such as dimethyl malonate and diethyl malonate. The blocking can be easily carried out by mixing a blocking agent with a non-blocked polyisocyanate compound. These polyisocyanate compounds may be used alone or in combinations of two or more, and a non-blocked polyisocyanate compound may also be used together with a blocked polyisocyanate compound.

From the viewpoint of the decontamination properties, scratch resistance and curability of the obtained coating film, the content of the polyisocyanate compound (B1) in the coating composition is preferably such that the equivalent ratio (NCO/OH) of isocyanate groups of the polyisocyanate compound (B1) and hydroxyl groups of the hydroxyl group-containing resin in the coating composition of the invention is generally in the range of 0.5 to 2.0 and especially 0.6 to 1.2.

From the viewpoint of the decontamination properties, scratch resistance and curability of the obtained coating film, the content of the polyisocyanate compound (B1) in the coating composition is preferably such that the solid content of the polyisocyanate compound (B1) is in the range of 0.1 to 50 mass %, more preferably in the range of 5 to 45 mass % and even more preferably in the range of 10 to 40 mass %, based on the mass of the resin solid content of the coating composition.

The amino resin used may be a partially methylolated amino resin or totally methylolated amino resin, obtained by reacting an amino component and an aldehyde component. Examples of such amino components include melamine, urea, benzoguanamine, acetoguanamine, steroguanamine, spiroguanamine and dicyandiamide. Aldehyde components include formaldehyde, paraformaldehyde, acetaldehyde and benzaldehyde.

The methylol groups in the methylolated amino resin may be partially or completely etherified with a suitable alcohol. Examples of alcohols to be used for the etherification include methyl alcohol, ethyl alcohol, n-propyl alcohol, isopropyl alcohol, n-butyl alcohol, isobutyl alcohol, 2-ethylbutanol and 2-ethylhexanol.

The amino resin is preferably a melamine resin (B2). Examples to be used for the melamine resin (B2) include alkyl etherified melamine resins obtained by partial or total etherification of the methylol groups of partially or totally methylolated melamine resins, with the aforementioned alcohols.

Preferred examples of alkyl etherified melamine resins include methyl etherified melamine resins having a methylol group of a partially or completely methylolated melamine resin partially or completely etherified with methyl alcohol; butyl etherified melamine resins having a methylol group of a partially or completely methylolated melamine resin partially or completely etherified with butyl alcohol; and methyl-butyl mixed etherified melamine resins having methylol groups of a partially or completely methylolated melamine resin partially or completely etherified with methyl alcohol and butyl alcohol.

The melamine resin (B2) used may be a commercial product. Examples of trade names of commercial products include "CYMEL 202", "CYMEL 203", "CYMEL 238", "CYMEL 251", "CYMEL 303", "CYMEL 323", "CYMEL 324", "CYMEL 325", "CYMEL 327", "CYMEL 350", "CYMEL 385", "CYMEL 1156", "CYMEL 1158", "CYMEL 1116" and "CYMEL 1130" (all products of Allnex, Japan), and "U-VAN 120", "U-VAN 20HS", "U-VAN 20SE60", "U-VAN 2021", "U-VAN 2028" and "U-VAN 28-60" (all products of Mitsui Chemicals, Inc.).

The resins mentioned above for the melamine resin (B2) may be used as single ones alone or combinations of two or more different ones.

The mixing proportion of the curing agent (B) may be appropriately set for adequate curing and performance of the coating film, but from the viewpoint of curability of the obtained coating film, the hydroxyl group-containing resin/curing agent (B) ratio in the coating composition of the invention is preferably in the range of 90/10 to 50/50 and more preferably in the range of 80/20 to 60/40, as mass ratio.

Dispersion of Acrylic Resin-Coated Silica Particles (C)

The dispersion of acrylic resin-coated silica particles (C) is a dispersion of acrylic resin-coated silica particles (C) which is the reaction product of silica particles with a polymerizable unsaturated group (c1) and a polymerizable unsaturated monomer mixture (c2), wherein the polymerizable unsaturated monomer mixture (c2) includes the polymerizable unsaturated monomer having a polysiloxane structure (c21) and alkoxysilyl group-containing polymerizable unsaturated monomer (c22) described below as at least a portion of its components.

Silica Particles with a Polymerizable Unsaturated Group (c1)

The silica particles with a polymerizable unsaturated group (c1) can be obtained by mixing and heating silica particles (c11), an organic solvent (c12) and a monomer having a polymerizable unsaturated group and a hydrolyzable silyl group (c13).

Silica Particles (c11)

The silica particles (c11) used may be any silica particles that can have their surfaces modified with polymerizable unsaturated groups, by forming covalent bonds by reaction with the monomer having a polymerizable unsaturated group and a hydrolyzable silyl group (c13), as described below. Such silica particles (c11) include dry silica, wet silica, silica gel, calcium ion-exchanged silica microparticles and colloidal silica, but particularly preferred is colloidal silica which consists of silica microparticles dispersed in a dispersing medium, and having hydroxyl and/or alkoxy groups on the particle surfaces.

Examples of dispersing media include water; alcohol-based solvents such as methanol, ethanol, isopropanol, n-propanol, isobutanol and n-butanol; polyhydric alcohol-based solvents such as ethylene glycol; polyhydric alcohol derivatives such as ethyleneglycol monoethyl ether, ethyleneglycol monobutyl ether and propyleneglycol monomethyl ether; and ketone-based solvents such as methyl ethyl ketone, methyl isobutyl ketone and diacetone alcohol. Preferred dispersing media are lower alcohol-based solvents and lower polyhydric alcohol derivatives with 3 or fewer carbon atoms. This is in order to facilitate removal in the solvent removal step during production of the silica particles with a polymerizable unsaturated group (c1).

Examples of colloidal silica include methanol silica sol, IPA-ST, MEK-ST, NBA-ST, XBA-ST, DMAC-ST, PGM-ST, ST-UP, ST-OUP, ST-20, ST-40, ST-C, ST-N, ST-O, ST-50 and ST-OL (all by Nissan Chemical Industries, Ltd.).

The mean primary particle size of the silica particles (c11) is preferably 5 to 100 nm and more preferably 5 to 50 nm. If the mean primary particle size is smaller than 5 nm, the effect of improving the mechanical and other properties may be reduced when the present dispersion is used in admixture with another organic material. If the mean primary particle size exceeds 100 nm, loss of transparency may result.

Throughout the present specification, the "mean primary particle size" means the median diameter (d50) in the volume-based particle size distribution, the volume-based particle size distribution being measured by laser diffraction/scattering. According to the invention, the volume-based particle size distribution of the present dispersion was measured using a "Microtrac NT3300" laser diffraction/scattering particle size distribution analyzer (trade name of Nikkiso Co., Ltd.). The sample concentration was adjusted for the prescribed transmittance range set by the apparatus.

Organic Solvent (c12)

The organic solvent (c12) is preferably a hydrophilic organic solvent, examples of hydrophilic organic solvents including alcohol-based organic solvents such as methanol, ethanol, isopropanol, n-butanol and isobutanol; ether-based organic solvents such as dioxane and tetrahydrofuran; glycol ether-based organic solvents such as ethyleneglycol monomethyl ether, ethyleneglycol monoethyl ether, ethyleneglycol mono-n-propyl ether, ethyleneglycol monoisopropyl ether, ethyleneglycol mono-n-butyl ether, ethyleneglycol monoisobutyl ether, ethyleneglycol mono-tert-butyl ether, diethyleneglycol monomethyl ether, diethyleneglycol monoethyl ether, diethyleneglycol mono-n-propyl ether, diethyleneglycol monoisopropyl ether, diethyleneglycol mono-n-butyl ether, diethyleneglycol monoisobutyl ether, diethyleneglycol mono-tert-butyl ether, propyleneglycol monomethyl ether, propyleneglycol monoethyl ether, propyleneglycol mono-n-propyl ether, propyleneglycol monoisopropyl ether, dipropyleneglycol monomethyl ether, dipropyleneglycol monoethyl ether, dipropyleneglycol mono-n-propyl ether and dipropyleneglycol monoisopropyl ether; and ester-based organic solvents such as ethyl acetate, butyl acetate, isobutyl acetate and 3-methoxybutyl acetate; any of which may be used alone or in combinations of two or more.

Preferred among these are alcohol-based organic solvents and/or glycol ether-based organic solvents, from the viewpoint of storage properties of the coating composition and scratch resistance of the obtained coating film. From the viewpoint of storage properties and scratch resistance, alcohol-based organic solvents with a boiling point of 64 to 132° C. and especially a boiling point of 82 to 118° C., and glycol ether-based organic solvents with a boiling point of 120 to 208° C. and especially a boiling point of 120 to 192° C. are preferred. Preferred among these are alcohol-based organic solvents of 2 to 8 and especially 3 to 5 carbon atoms, and glycol ether-based organic solvents of 3 to 5 and especially 3 to 4 carbon atoms, from the viewpoint of storage properties of the coating composition and scratch resistance of the obtained coating film.

Monomer having a Polymerizable Unsaturated Group and a Hydrolyzable Silyl Group (c13)

The monomer having a polymerizable unsaturated group and a hydrolyzable silyl group (c13) may be, for example, 3-(meth)acryloyloxypropyltrimethoxysilane, 3-(meth)acryloyloxypropyltriethoxysilane, 2-(meth)acryloyloxyethyltrimethoxysilane, 2-(meth)acryloyloxyethyltriethoxysilane, 3-(meth)acryloyloxypropylmethyldimethoxysilane, 2-(meth)acryloyloxyethylmethyldimethoxysilane, vinyltrimethoxysilane, vinyltriethoxysilane, allyltrimethoxysilane, allyltriethoxysilane, or a monomer having a polymerizable unsaturated group and a hydrolyzable silyl group obtained by reacting a functional group other than the hydrolyzable silyl group of a silane coupling agent with a functional group other than the unsaturated group of an unsaturated compound.

The silica particles with a polymerizable unsaturated group (c1) can be obtained by heating and mixing the silica particles (c11), the organic solvent (c12) and the monomer having a polymerizable unsaturated group and a hydrolyzable silyl group (c13).

More specifically, it may be produced by mixing the silica particles (c11) dispersed in a dispersing medium, the organic solvent (c12), and the monomer having a polymerizable unsaturated group and a hydrolyzable silyl group (c13), and azeotropically distilling off the organic solvent (c12) and the dispersing medium of the silica particles (c11) (including any lower alcohols produced by hydrolysis of the monomer having a polymerizable unsaturated group and a hydrolyzable silyl group (c13) at ordinary pressure or under reduced pressure, exchanging the dispersing medium with the organic solvent (c12) while, or before, conducting dehydrating condensation reaction with heating.

The nonvolatile content concentration of the dispersion during the reaction is preferably in the range of about 5 to about 50 mass %. If the nonvolatile content concentration is less than about 5 mass %, i.e. if the solvent content is greater than about 95 mass %, then the reaction time between the silica particles (c11) and the monomer having a polymerizable unsaturated group and a hydrolyzable silyl group (c13) will be longer, potentially lowering the production efficiency. On the other hand, if the nonvolatile content concentration is greater than about 50 mass %, the product may potentially undergo gelation.

In this production method, the silicon atoms on the surfaces of the silica particles (c11) and the silicon atoms of the monomer having a polymerizable unsaturated group and a hydrolyzable silyl group (c13) bond via oxygen atoms forming siloxane bonds, thereby allowing a dispersion of silica particles with a polymerizable unsaturated group (c1) to be obtained, with chemical bonding between the silica particles (c11) and the monomer having a polymerizable unsaturated group and a hydrolyzable silyl group (c13).

The mixing proportion of the monomer having a polymerizable unsaturated group and a hydrolyzable silyl group (c13), for obtaining the silica particles with a polymerizable unsaturated group (c1), is preferably from about 0.2 part by mass to about 95 parts by mass, more preferably from about 0.5 part by mass to about 50 parts by mass, and even more preferably from about 1.0 part by mass to about 20 parts by mass, with respect to 100 parts by mass of the silica particles (c11). If the proportion of the monomer having a polymerizable unsaturated group and a hydrolyzable silyl group (c13) is less than about 0.2 part by mass, the resulting silica particles with a polymerizable unsaturated group (c1) can potentially have poor stability in the dispersing medium. If the proportion of the monomer having a polymerizable unsaturated group and a hydrolyzable silyl group (c13) is greater than about 95 parts by mass, unreacted residue of the monomer having a polymerizable unsaturated group and a hydrolyzable silyl group (c13) may remain during the reaction with the silica particles (c11).

In order to obtain silica particles with a polymerizable unsaturated group (c1), an alkoxysilane with an alkyl group of 1 or more carbon atoms may be reacted with the silica particles (c11) if necessary, together with the monomer having a polymerizable unsaturated group and a hydrolyzable silyl group (c13). Reacting the alkoxysilane with an alkyl group of one or more carbon atoms may improve the water resistance of the coating film that is to be obtained. Examples of alkoxysilanes with an alkyl group of one or more carbon atoms include methyltrimethoxysilane, ethyltrimethoxysilane, propyltrimethoxysilane, butyltrimethoxysilane, hexyltrimethoxysilane, decyltrimethoxysilane and dodecyltrimethoxysilane, as well as these compounds that have the methoxy groups replaced with ethoxy groups (for example, methyltriethoxysilane).

Polymerizable Unsaturated Monomer Mixture (c2)

The polymerizable unsaturated monomer mixture (c2) includes a polymerizable unsaturated monomer having a polysiloxane structure (c21) and an alkoxysilyl group-containing polymerizable unsaturated monomer (c22), as at least a portion of its components.

Polymerizable Unsaturated Monomer having a Polysiloxane Structure (c21)

The polymerizable unsaturated monomer having a polysiloxane structure (c21) is a polymerizable unsaturated monomer represented by the following formula (I):

[Chemical Formula 3]

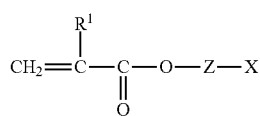

(I)

(where $R^1$ represents a hydrogen atom or a methyl group, Z represents a structure including the following formula (II), and X represents a hydrogen atom or a (meth)acryloyl, alkyl, hydroxyl, amino, (alicyclic) epoxy, carboxyl, mercapto, vinyl, isocyanate or aryl group)

[Chemical Formula 4]

(II)

(where m represents a number of 2 to 160, $R^2$ represent phenyl groups or alkyl groups of 1 to 6 carbon atoms which may be the same or different, and $R^3$ represents an alkylene group of 1 to 6 carbon atoms).

In formula (I), X represents a hydrogen atom or a group selected from among (meth)acryloyl, alkyl, hydroxyl, amino, (alicyclic) epoxy, carboxyl, mercapto, vinyl, isocyanate and aryl groups, but it is preferably a group selected from among (meth)acryloyl and alkyl groups, and more preferably it is a group selected from among (meth)acryloyl groups and alkyl groups of 1 to 10 carbon atoms.

In formula (II), m represents an integer in the range of 2 to 160, but it is preferably an integer in the range of 5 to 65 and more preferably in the range of 5 to 45.

The $R^2$ groups in formula (II) represent phenyl groups or alkyl groups of 1 to 6 carbon atoms, which may be the same or different, but preferably they represent alkyl groups of 1 to 3 carbon atoms, and more preferably methyl groups.

The $R^3$ group in formula (II) represents an alkylene group of 1 to 6 carbon atoms, but preferably it is an alkylene group of 1 to 3 carbon atoms, and more preferably a methylene group.

From the viewpoint of transparency of the obtained coating film, the number-average molecular weight of the polymerizable unsaturated monomer having a polysiloxane structure (c21) is preferably 13,000 or lower and more preferably 2600 or lower, while from the viewpoint of decontamination properties and scratch resistance of the obtained coating film it is also preferably 100 or higher and more preferably 400 or higher.

The polymerizable unsaturated monomer having a polysiloxane structure (c21) may be a commercial product. Examples of trade names of commercial products include "SILAPLANE FM-0721", "SILAPLANE FM-0711" and "SILAPLANE FM-0725" (all trade names of JNC Co.), and "X-22-174ASX", "X-22-174BX", "KF-2012", "X-22-2426", "X-22-2404" and "X-22-2475" (all trade names of Shin-Etsu Chemical Co., Ltd.).

From the viewpoint of scratch resistance and decontamination properties, the proportion of the polymerizable unsaturated monomer having a polysiloxane structure (c21) in the polymerizable unsaturated monomer mixture (c2) is preferably in the range of 0.1 to 20 mass %, more preferably in the range of 0.2 to 10 mass % and most preferably in the range of 0.3 to 5 mass %.

Alkoxysilyl Group-Containing Polymerizable Unsaturated Monomer (c22)

The alkoxysilyl group-containing polymerizable unsaturated monomer (c22) is a compound having one or more alkoxysilyl groups and one or more polymerizable unsaturated groups in the molecule.

Specific examples for the alkoxysilyl group-containing polymerizable unsaturated monomer include vinyltrimethoxysilane, vinyltriethoxysilane, acryloxyethyltrimethoxysilane, methacryloxyethyltrimethoxysilane, acryloxypropyltrimethoxysilane, methacryloxypropyltrimethoxysilane, acryloxypropyltriethoxysilane, methacryloxypropyltriethoxysilane and vinyltris(β-methoxyethoxy)silane. Preferred alkoxysilyl group-containing polymerizable unsaturated monomers among these are vinyltrimethoxysilane, γ-acryloxypropyltrimethoxysilane and γ-methacryloxypropyltrimethoxysilane.

From the viewpoint of scratch resistance, the proportion of the alkoxysilyl group-containing polymerizable unsaturated monomer (c22) in the polymerizable unsaturated monomer mixture (c2) is preferably in the range of 5 to 60 mass %, more preferably in the range of 15 to 55 mass % and most preferably in the range of 20 to 50 mass %.

The polymerizable unsaturated monomer mixture (c2) may include another polymerizable unsaturated monomer (c23) that is copolymerizable, together with the polymerizable unsaturated monomer having a polysiloxane structure (c21) and a polymerizable unsaturated monomer (c22) containing an alkoxysilyl group, as at least a portion of its components.

Other Polymerizable Unsaturated Monomer (c23)

The other polymerizable unsaturated monomer (c23) may be a compound having one or more polymerizable unsaturated groups in the molecule, being a polymerizable unsaturated monomer other than the polymerizable unsaturated monomer having a polysiloxane structure (c21) and the alkoxysilyl group-containing polymerizable unsaturated monomer (c22). Specific examples include the following.

(1) Hydroxyl group-containing polymerizable unsaturated monomer: The hydroxyl group-containing polymerizable unsaturated monomer is a compound having one or more hydroxyl groups and one or more polymerizable unsaturated groups in the molecule. The hydroxyl group-containing polymerizable unsaturated monomer may be, for example, any of the hydroxyl group-containing polymerizable unsaturated monomers listed above for the acrylic resin having a hydroxyl group and an alkoxysilyl group (A1).

(2) Polymerizable unsaturated monomers with alicyclic hydrocarbon groups: Polymerizable unsaturated monomers with alicyclic hydrocarbon groups may be cyclohexyl (meth)acrylate, isobornyl (meth)acrylate, tricyclodecanyl (meth)acrylate, adamantyl (meth)acrylate, 3,5-dimethyladamantyl (meth)acrylate, 3-tetracyclododecyl methacrylate, 4-methylcyclohexylmethyl (meth)acrylate, 4-ethylcyclohexylmethyl (meth)acrylate, 4-methoxycyclohexylmethyl (meth)acrylate, tert-butylcyclohexyl (meth)acrylate, cyclooctyl (meth)acrylate, cyclododecyl (meth)acrylate, tetrahydrofurfuryl (meth)acrylate, or the like.

(3) Acid group-containing polymerizable unsaturated monomers: Compounds having at least one acid group and one unsaturated bond in the molecule, examples of which include carboxyl group-containing polymerizable unsaturated monomers such as (meth)acrylic acid, crotonic acid, itaconic acid, maleic acid and maleic anhydride; sulfonic acid group-containing polymerizable unsaturated monomers such as vinylsulfonic acid and sulfoethyl (meth)acrylate; and acidic phosphoric acid ester-based polymerizable unsaturated monomers such as 2-(meth)acryloyloxyethyl acid phosphate, 2-(meth)acryloyloxypropyl acid phosphate, 2-(meth)acryloyloxy-3-chloropropyl acid phosphate and 2-methacroyloxyethylphenylphosphoric acid.

(4) Monoesters of (meth)acrylic acid and monohydric alcohols of 1 to 20 carbon atoms; Examples include methyl (meth)acrylate, ethyl (meth)acrylate, propyl (meth)acrylate, n-butyl (meth)acrylate, iso-butyl (meth)acrylate, tert-butyl (meth)acrylate, 2-ethylhexyl (meth)acrylate, isooctyl (meth) acrylate, isomyristyl (meth)acrylate, isostearyl acrylate (trade name of Osaka Organic Chemical Industry, Ltd.), lauryl (meth)acrylate, tridecyl (meth)acrylate and stearyl (meth)acrylate.

(5) Aromatic polymerizable unsaturated monomers: Examples include styrene, α-methylstyrene and vinyltoluene.

(6) Glycidyl group-containing polymerizable unsaturated monomers: Compounds having one glycidyl group and one unsaturated bond in the molecule, specific examples including glycidyl acrylate and glycidyl methacrylate.

(7) Nitrogen-containing polymerizable unsaturated monomers: Examples include (meth)acrylamide, dimethylacrylamide, N,N-dimethylpropylacrylamide, N-butoxymethylacrylamide, N-methylolacrylamide, N-methylolmethacrylamide, diacetoneacrylamide, N,N-dimethylaminoethyl (meth)acrylate, vinylpyridine and vinylimidazole.

(8) Other vinyl compounds: Examples include vinyl acetate, vinyl propionate, vinyl chloride and the vinyl versatate esters "VEOVA 9" and "VEOVA 10" (trade names of Hexion Co.).

(9) Unsaturated bond-containing nitrile-based compounds: Examples include acrylonitrile and methacrylonitrile.

Such other polymerizable unsaturated monomers (c23) may be used alone or in combinations of two or more.

From the viewpoint of decontamination properties and scratch resistance of the coating film that is to be formed, the other polymerizable unsaturated monomer (c23) preferably includes the hydroxyl group-containing polymerizable unsaturated monomer (1) as at least a portion thereof. From the viewpoint of decontamination properties and scratch resistance of the coating film that is formed, the hydroxyl group-containing polymerizable unsaturated monomer (1) is preferably a hydroxyl group-containing polymerizable unsaturated monomer having a hydrocarbon group of 2 to 20 carbon atoms, more preferably a hydroxyl group-containing polymerizable unsaturated monomer having a hydrocarbon group of 2 to 8 carbon atoms and more preferably a hydroxyl group-containing polymerizable unsaturated monomer having a hydrocarbon group of 2 to 4 carbon atoms, and specifically 2-hydroxyethyl (meth)acrylate, 2-hydroxypropyl (meth)acrylate, 4-hydroxybutyl (meth)acrylate and 4-methylolcyclohexyl acrylate are preferred.

When the other polymerizable unsaturated monomer (c23) comprises the hydroxyl group-containing polymerizable unsaturated monomer (1), the content ratio of the hydroxyl group-containing polymerizable unsaturated monomer (1) is preferably in the range of 15 to 55 mass % and more preferably in the range of 20 to 50 mass % based on the total mass of the polymerizable unsaturated monomer mixture (c2), from the viewpoint of the decontamination properties and scratch resistance of the coating film that is formed.

Method for Producing Dispersion of Acrylic Resin-Coated Silica Particles (C)

The dispersion of acrylic resin-coated silica particles (C) can be obtained by polymerization reaction of the silica particles with a polymerizable unsaturated group (c1) and the polymerizable unsaturated monomer mixture (c2), in the presence of a solvent. The polymerization method is not particularly restricted and any publicly known polymerization method may be used, but it is preferred to use a solution polymerization method in which polymerization is conducted in an organic solvent, in the presence of an appropriate catalyst and polymerization initiator.

Examples of organic solvents to be used in the solution polymerization method include aromatic compounds such as benzene, toluene, xylene, ethylbenzene, "SWASOL 1000" and "SWASOL 1500" (trade names of Maruzen Petrochemical Co., Ltd., high-boiling-point petroleum-based solvents), hydrocarbon-based solvents such as pentane, hexane, heptane, octane, cyclohexane, cycloheptane and mineral spirits; halogenated hydrocarbons such as trichlorethylene and tetrachlorethylene; ester-based solvents such as ethyl acetate, n-butyl acetate, isobutyl acetate, ethyl propionate, methylcellosolve acetate, butylcarbitol acetate, ethyleneglycol monomethyl ether acetate, diethyleneglycol monobutyl ether acetate, propyleneglycol monomethyl ether and ethyl 3-ethoxypropionate; ketone-based solvents such as methyl ethyl ketone, methyl isobutyl ketone, diisobutyl ketone and cyclohexanone; alcohol-based solvents such as methanol, ethanol, isopropanol, n-butanol, sec-butanol, isobutanol, ethylene glycol, ethyleneglycol monomethyl ether, ethyleneglycol monoethyl ether and ethyleneglycol monobutyl ether; ether-based solvents such as n-butyl ether, dioxane, dibutyl ether and ethyleneglycol dimethyl ether; and dimethyl sulfoxide, dimethylformamide, N-methylpyrrolidone or water. Any of these organic solvents may be used alone or in combinations of two or more. Of these, aromatic compounds, alcohol-based solvents and ester-based solvents are preferred from the viewpoint of stability of the dispersion of acrylic resin-coated silica particles (C), with alcohol-based solvents and ester-based solvents being particularly preferred.

The polymerization initiator to be used for polymerization is not particularly restricted, and examples include known radical polymerization initiators, among which are peroxide-based polymerization initiators such as benzoyl peroxide, para-menthane hydroperoxide, cumene hydroperoxide, lauroyl peroxide, cyclohexanone peroxide, 3,3,5-trimethylcyclohexanone peroxide, methylcyclohexanone peroxide, tert-butyl peroxypivalate, 1,1'-bis(tert-butylperoxy)cyclohexane, 1,1-bis(tert-butylperoxy)-3,3,5-trimethylcyclohexane, n-butyl-4,4-bis(tert-butylperoxy) valerate, 2,2'-di(tert-butylperoxy)butane, tert-butyl hydroxyperoxide, 2,5-dimethylhexane-2,5-dihydroperoxide, di-tert-butyl peroxide, di-n-propyl peroxydicarbonate, tert-hexylperoxy-2-ethyl hexanoate, 1,3-bis(tert-butylperoxy-m-isopropyl)benzene, 2,5-dimethyl-2,5-di(tert-butylperoxy)hexane, diisopropylbenzene peroxide, tert-butylcumyl peroxide, decanoyl peroxide, lauroyl peroxide, benzoyl peroxide, 2,4-dichlorobenzoyl peroxide, bis(tert-butylcyclohexyl)peroxy dicarbonate, tert-butyl peroxybenzoate, 2,5-dimethyl-2,5-di(benzoylperoxy)hexane and hydrogen peroxide; azo-based polymerization initiators such as 1,1-azobis(cyclohexane-1-carbonitrile), azocumene, 2,2'-azobis-(2,4-dimethylvaleronitrile), 2,2'-azobis(2-methylbutyronitrile), 2,2'-azobisisobutyronitrile, 2,2'-azobis-(4-methoxy-2,4-dimethylvaleronitrile, dimethyl 2,2'-azobis(2-methyl propionate), 2,2'-di(2-hydroxyethyl)azobisisobutyronitrile, 4,4'-azobis(4-cyanovaleric acid), 2-(tert-butylazo)-2-cyanopropane, 2,2'-azobis(2,4,4-trimethylpentane), 2,2'-azobis(2-methylpropane), dimethyl 2,2'-azobis(2-methyl propionate) and 2,2'-azobis-(N-butyl-2-methylpropionamide); persulfuric acid-based initiators such as potassium persulfate and sodium persulfate; and redox-based initiators comprising peroxides and reducing agents.

The amount of radical polymerization initiator used is preferably 0.1 to 20 parts by mass and more preferably 1 to 10 parts by mass, with respect to 100 parts by mass of the polymerizable unsaturated monomer mixture (c2). If the amount of the radical polymerization initiator is less than 0.1 part by mass, the proportion of unreacted polymerizable unsaturated monomer mixture (c2) that does not react with the silica particles with a polymerizable unsaturated group (c1) will potentially increase. If the amount of the radical polymerization initiator is greater than 20 parts by mass, aggregation of the particles may occur due to polymerization between the acrylic resin-coated silica particles. The acrylic resin-coated silica particles may also include an unreacted polymerizable unsaturated monomer mixture (c2), or polymer that has resulted from reaction between the polymerizable unsaturated monomer mixture (c2), but that has not reacted with the silica particles with a polymerizable unsaturated group (c1).

The mixing ratio of the dispersion of silica particles with a polymerizable unsaturated group (c1) and the polymerizable unsaturated monomer mixture (c2) is preferably in the range of (c1)/(c2)=20/80 to 90/10, more preferably in the range of 30/70 to 80/20 and most preferably in the range of 40/60 to 60/40, as solid mass ratio, from the viewpoint of decontamination properties and scratch resistance of the coating film to be formed. When the reaction between the silica particles with a polymerizable unsaturated group (c1) and the polymerizable unsaturated monomer mixture (c2) is to be carried out in a solvent, the total mass concentration of the silica particles with a polymerizable unsaturated group (c1) and the polymerizable unsaturated monomer mixture (c2) is preferably in the range of about 10 mass % to about 90 mass %, and especially about 20 mass % to about 70 mass %. If the total mass concentration is less than about 10 mass %, the reaction time will be longer and the production efficiency may be reduced. If the total mass concentration is higher than about 90 mass %, the viscosity of the reaction system will increase, and stirring may become difficult.

From the viewpoint of minimizing inhibition of the polymerization reaction by oxygen and increasing the reaction rate, the reaction is preferably carried out while exchanging the gas phase in the reactor with an inert gas and agitating. The reaction temperature and reaction time can be appropriately selected depending on the type of polymerizable unsaturated monomer mixture (c2), but preferably the reaction temperature is in the range of about 0° C. to about 250° C. and the reaction time is in the range of 1 to 72 hours. The reaction will usually be carried out under ordinary pressure, but it may instead by carried out either under pressurization or under reduced pressure.

The polymerization rate of the polymerizable unsaturated monomer mixture (c2) for the reaction is preferably about 90% or higher and more preferably about 95% or higher. If the polymerization rate of the polymerizable unsaturated monomer mixture (c2) is lower than about 90% the film performance such as scratch resistance may be inferior, and when the obtained dispersion of acrylic resin-coated silica particles (C) is used, problematic odor may be generated due to the unreacted polymerizable unsaturated monomer mixture (c2). The amount of unreacted polymerizable unsaturated monomer mixture (c2) can be reduced by extending the reaction time. When the amount of unreacted polymerizable unsaturated monomer mixture (c2) is low, it can be reduced by adding a radical polymerization initiator and conducting further polymerization reaction.

From the viewpoint of storage stability of the coating material and scratch resistance of the obtained coating film, the molecular weight of the resin covering the silica particles is preferably in the range of 400 to 6000, more preferably in the range of 1000 to 5500 and even more preferably in the range of 3000 to 5000.

The hydroxyl value of the resin covering the silica particles in the dispersion of acrylic resin-coated silica particles (C) obtained by this production method is preferably in the range of 100 to 200 mgKOH/g, especially in the range of 120 to 200 mgKOH/g and most especially in the range of 140 to 200 mgKOH/g, from the viewpoint of the scratch resistance of the formed coating film.

In addition, the glass transition temperature Tg of the resin covering the silica particles in the dispersion of acrylic resin-coated silica particles (C) obtained by the production method is preferably in the range of −30 to 50° C., and more preferably in the range of −20 to 40° C., from the viewpoint of the scratch resistance of the formed coating film.

The content of the dispersion of acrylic resin-coated silica particles (C) in the present coating material may be in the range of 0.1 to 25 parts by mass, particularly 0.5 to 25 parts by mass and most particularly 1 to 20 parts by mass, based on 100 parts by mass as the total solid content of the resin with a hydroxyl group and an alkoxysilyl group (A) and curing agent (B).

The contents of the resin with a hydroxyl group and an alkoxysilyl group (A), the curing agent (B) and the dispersion of acrylic resin-coated silica particles (C) in the present coating material are preferably in the following ranges based on the 100 parts by mass as the total resin solid content of the present coating material, from the viewpoint of decontamination properties, scratch resistance and transparency of the obtained coating film.

Resin with a hydroxyl group and an alkoxysilyl group (A): 20 to 80 parts by mass, preferably 30 to 75 parts by mass and more preferably 40 to 70 parts by mass, Curing agent (B): 10 to 60 parts by mass preferably 15 to 55 parts by mass and more preferably 20 to 50 parts by mass, Acrylic resin-coated silica particles (C): 0.5 to 30 parts by mass, preferably 1 to 25 parts by mass and more preferably 3 to 20 parts by mass.

The reason why the coating composition comprising the resin with a hydroxyl group and an alkoxysilyl group (A), the curing agent (B) and the dispersion of acrylic resin-coated silica particles (C) according to the invention is able to form a coating film with excellent decontamination properties, scratch resistance and transparency is thought to be that the acrylic resin-coated silica particles (C) segregate in the coating film surface layer due to their polysiloxane structure, the alkoxysilyl groups in the acrylic resin-coated silica particles (C) participate in crosslinking reaction with the alkoxysilyl groups in the resin with a hydroxyl group and an alkoxysilyl group (A), the alkoxysilyl groups in the resin with a hydroxyl group and an alkoxysilyl group (A) participate in crosslinking reaction with the alkoxysilyl groups in the resin with a hydroxyl group and an alkoxysilyl group (A), and the hydroxyl groups in the resin with a hydroxyl group and an alkoxysilyl group (A) participate in crosslinking reaction with the curing agent (B), thereby forming on the coating film surface a layer in which hard acrylic resin-coated silica particles (C) are firmly bonded within the dense crosslinked structure comprising the resin with a hydroxyl group and an alkoxysilyl group (A) and curing agent (B), so that a coating film with excellent decontamination properties and scratch resistance is formed.

In addition, it is thought that the alkoxysilyl group of the resin with a hydroxyl group and an alkoxysilyl group (A) and the alkoxysilyl groups and polysiloxane structure of the acrylic resin-coated silica particles (C) result in relatively high affinity between the resin with a hydroxyl group and an alkoxysilyl group (A) and the acrylic resin-coated silica particles (C), so that a coating film with excellent transparency is formed.

Other Components

The present coating material may further contain common coating material additives such as curing catalysts, pigments, ultraviolet absorbers (for example, benzotriazole-based absorbers, triazine-based absorbers, salicylic acid derivative-based absorbers and benzophenone-based absorbers), light stabilizers (for example, hindered piperidines), dehydrating agents, thickening agents, antifoaming agents, plasticizers, organic solvents, surface control agents and anti-settling agents, either alone or in combinations of two or more.

Examples of curing catalysts include organometallic catalysts such as tin octylate, dibutyltin di(2-ethyl hexanoate), dioctyltin di(2-ethyl hexanoate), dioctyltin diacetate, dibutyltin dilaurate, dibutyltin oxide, dioctyltin oxide and lead 2-ethylhexanoate, sulfonic acids such as paratoluenesulfonic acid, dodecylbenzenesulfonic acid and dinonylnaphthalenesulfonic acid, and their salts with amine compounds, alkylphosphoric acid esters such as monobutylphosphoric acid, dibutylphosphoric acid, mono (2-ethylhexyl)phosphoric acid and di(2-ethylhexyl)phosphoric acid, and their salts with amine compounds, and tertiary amines. Any of these may be used alone or in combinations of two or more.

When the present coating material contains a curing catalyst, the curing catalyst content is preferably in the range of 0.05 to 10 parts by mass, more preferably in the range of 0.1 to 5 parts by mass and even more preferably in the range of 0.2 to 3 parts by mass, based on 100 parts by mass as the total resin solid content of the present coating material.

When the present coating material contains an ultraviolet absorber, the ultraviolet absorber content is preferably in the range of 0.1 to 10 parts by mass, more preferably in the range of 0.2 to 5 parts by mass and even more preferably in the range of 0.3 to 2 parts by mass, based on 100 parts by mass as the total resin solid content of the present coating material.

When the present coating material contains a light stabilizer, the light stabilizer content is preferably in the range of 0.1 to 10 parts by mass, more preferably in the range of 0.2 to 5 parts by mass and even more preferably in the range of 0.3 to 2 parts by mass, based on 100 parts by mass as the total resin solid content of the present coating material.

Examples of dehydrating agents include metal alkoxides such as aluminum isopropylate, aluminum sec-butyrate, tetraisopropyl titanate, tetra-normal-butyl titanate, zirconium-normal-butyrate, ethyl silicate and vinyltrimethoxysilane; organic alkoxy compounds such as trimethyl orthoformate, triethyl orthoformate, trimethyl orthoacetate, triethyl orthoacetate, triisopropyl orthoacetate and dimethoxypropane; and monofunctional isocyanates such as "ADDITIVE TI" (trade name of Sumika Bayer Urethane Co., Ltd.); any of which may be used alone or in combinations of two or more.

The dehydrating agent may also be used during production of the dispersion of acrylic resin-coated silica particles (C).

When the present coating material contains a dehydrating agent, the dehydrating agent content is preferably in the range of 0.01 to 15 parts by mass and more preferably in the range of 0.1 to 8 mass %, based on 100 parts by mass as the total resin solid content of the present coating material.

The present coating material may be a one-pack type coating material, or a multi-pack coating material such as a two-pack resin coating material. When an unblocked polyisocyanate compound is used as the curing agent in the present coating material, from the viewpoint of storage stability it is preferred to use a two-pack coating material containing a base compound including the hydroxyl group-containing resin, and the curing agent, the two being mixed just prior to use.

The form of the present coating material is not particularly restricted, but is preferably an organic solution form or nonaqueous dispersion form.

Examples of organic solvents include ketones such as acetone, methyl ethyl ketone and methyl isobutyl ketone; esters such as ethyl acetate, butyl acetate, methyl benzoate, ethyl ethoxypropionate, ethyl propionate and methyl propionate; ethers such as tetrahydrofuran, dioxane and dimethoxyethane; glycol ethers such as ethyleneglycol monomethyl ether, ethyleneglycol monoethyl ether, diethyleneglycol monomethyl ether, propyleneglycol monomethyl ether acetate and 3-methoxybutyl acetate; aromatic hydrocarbons, aliphatic hydrocarbons, and the like. These may be used in appropriate combinations, depending on the purpose, such as adjusting the viscosity or adjusting the coatability.

The solid content of the present coating material is not particularly restricted. From the viewpoint of smoothness of the cured coating film and shortening the drying time, for example, it is preferred to carry out appropriate adjustment using a solvent such as an organic solvent, so that the viscosity is in the range of 15 to 60 seconds as measured with a Ford cup No. 4 at 20° C.

Throughout the present specification, "solid content" means the residue remaining after removing the volatile components, and the residue may be in either solid form or liquid form at ordinary temperature. The solid mass can be calculated by defining the solid content as the proportion of the residual mass when dried with respect to the mass before drying, and multiplying the solid content by the sample mass before drying.

Coating Method

There are no particular restrictions on the article to be coated, on which the present coating material is to be applied. Examples include metal base materials, for example, steel sheets such as cold-rolled steel sheets, galvanized steel sheets, zinc alloy-plated steel sheets, stainless steel plates or tin plated steel sheets, or aluminum sheets or aluminum alloy sheets; or various types of plastic materials. Also to be mentioned are automobile bodies, trucks, motorcycles, buses, automobile parts, railway vehicles, two-wheel vehicles, industrial machinery, buildings and structures made from such materials. The article to be coated may also be a metal base material or metal surface of a car body that has been surface-treated by phosphate treatment, chromate treatment or complex oxide treatment. The article to be coated may be one having an undercoat coating film such as an electrodeposition coating formed, or one having an undercoat coating film and intermediate coating film formed, or one having an undercoat coating film, an intermediate coating film and a base coating film formed, or one having an undercoat coating film, intermediate coating film, base coating film and clear coating film formed, on any of the metal base materials or car bodies mentioned above.

The method of applying the present coating material is not particularly restricted, and for example, there may be mentioned air spray coating, airless spray coating, rotary atomizing coating, curtain coating or the like, which methods allow formation of wet coating films. Electrostatic application may also be used in the coating method if necessary. Air spray coating and airless spray coating or rotary atomizing coating are especially preferred among these.

The coating amount of the present coating material is usually preferred to be an amount for a cured film thickness of about 10 to 100 μm.

Curing of a wet coating film of the present coating material on an article to be coated may be carried out at ordinary temperature, or with heating. Curing is preferably carried out with heating from the viewpoint of decontamination properties, scratch resistance and production efficiency.

When the curing is carried out at ordinary temperature, the article is preferably allowed to stand for 7 days or longer, more preferably 10 days or longer and most preferably 14 days or longer.

When the curing is carried out with heating, it may be heated with known heating means with a drying furnace such as, for example, an air heating furnace, electric furnace, infrared induction heating furnace or the like. The heating temperature is preferably in the range of 50 to 180° C. and especially 60 to 150° C. The heating time is not particularly restricted but will usually be in the range of 10 to 60 minutes and most preferably 15 to 30 minutes.

Because the present coating material can produce a cured coating film with excellent scratch resistance and an excellent coated film appearance, it can be suitably used as an overcoat top clear coating material composition. The present coating material is particularly suitable as a coating material for an automobile.

Method for Forming Multilayer Coating Film

The multilayer coating film-forming method, by which the present coating material is applied as an overcoat top clear coating material, may be a multilayer coating film-forming method in which at least one colored base coating material and at least one clear coating material are applied in that order on the article to be coated, or a multilayer coating film-forming method in which the coating composition of the invention is applied as the uppermost clear coating material.

A specific example is a 2-coat, 1-bake type multilayer coating film-forming method in which, for example, a solvent-type or aqueous base coating material is applied onto an article to be coated that has an electrodeposition and/or intermediate coating material formed on it, if necessary with preheating at 40 to 90° C. for about 3 to 30 minutes, for example, to promote volatilization of the solvent in the base coating material, without hardening the coating film, and the present coating material is applied as a clear coating material onto the uncured base coating film, after which the base coat and clear coat are hardened together; or a 3-coat, 1-bake type method for forming a multilayer coating film in which a solvent-type or aqueous intermediate coating material is applied onto an article to be coated that has an electrodeposition coating, if necessary with preheating at 40 to 90° C. for about 3 to 30 minutes, for example, to promote volatilization of the solvent in the intermediate coating material, without hardening the coating film, a solvent-type or aqueous base coating material is applied onto the uncured intermediate coating film, if necessary with preheating at 40 to 90° C. for about 3 to 30 minutes, for example, to promote volatilization of the solvent in the base coating material, without hardening of the coating film, and the present coating material is applied as a clear coating material onto the uncured base coating film, after which the intermediate coating material, the base coat and the clear coat are cured together.

The intermediate coating material to be used may be a thermosetting intermediate coating material that is commonly known in the prior art, and specifically, the coating material used may comprise a curing agent such as an amino resin, polyisocyanate compound or blocked polyisocyanate compound, in combination with a base resin such as an acrylic resin, polyester resin, alkyd resin or urethane resin, as appropriate for reactivity with the reactive functional groups of the base resin. The reactive functional groups in the base resin are preferably hydroxyl groups.

Examples of intermediate coating materials to be used include aqueous coating materials, organic solvent-based coating materials and powder coating materials. Aqueous coating materials are preferred from the viewpoint of reducing environmental load and obtaining a superior finished outer appearance for the coating film.

The base coating material to be used may be a thermosetting base coating material that is commonly known in the prior art, and specifically, a curing agent such as an amino resin, polyisocyanate compound or blocked polyisocyanate compound may be used in combination with a base resin such as an acrylic resin, polyester resin, alkyd resin or urethane resin, as appropriate for the reactive functional groups of the base resin, and a color pigment or brightness pigment may be further added, for use as the coating material.

Examples of base coating materials to be used include aqueous coating materials, organic solvent-based coating materials and powder coating materials. Aqueous coating materials are preferred from the viewpoint of reducing environmental load and obtaining a superior finished outer appearance for the coating film.

The present coating material may be suitably used as a top clear coating material in a three-coat, two-bake system that includes applying a base coating material and first clear coating material in that order, and heat curing them, and then applying the top clear coating material onto the first clear coating film and heat curing it. The present coating material may also be suitably used as a top clear coating material in a 3-coat, 1-bake system that includes applying a colored base coating material, a brightness pigment-containing base coating material and the top clear coating material in that order.

When using two or more clear coats in a multilayer coating film-forming method, the clear coating material other than that of the uppermost layer may be any common thermosetting clear coating material known in the prior art.

EXAMPLES

The present invention will now be explained in greater detail using Production Examples, Examples and Comparative Examples. However, the invention is in no way limited by the examples. Throughout the examples, the "parts" and "%" values are based on mass, unless otherwise specified. The film thicknesses of the coating films are based on the cured coating films.

Production of Acrylic Resin having a Hydroxyl Group and an Alkoxysilyl Group (A1)

Production Example 1

In a reactor equipped with a thermometer, thermostat, stirrer, reflux condenser, nitrogen inlet tube and dropper there were charged 30 parts of "SWASOL 1000" (trade name of Cosmo Oil Co., Ltd., aromatic organic solvent) and 10 parts of n-butanol. After stirring the charged liquid while blowing nitrogen gas into the reactor at 125° C., a monomer mixture comprising 30 parts of γ-methacryloxypropyltrimethoxysilane, 35 parts of 2-hydroxypropyl acrylate, 20 parts of styrene, 15 parts of isobutyl methacrylate and 3 parts of 2,2'-azobis(2-methylbutyronitrile) (polymerization initiator) was added dropwise at a uniform rate over a period of 4 hours. After subsequently ageing at 125° C. for 30 minutes, a solution comprising 0.5 part of 2,2'-azobis(2-methylbutyronitrile) and 5.0 parts of "SWASOL 1000" was added dropwise at a uniform rate over a period of 1 hour. The mixture was then aged at 125° C. for 1 hour and cooled, and further diluted by addition of 6 parts of isobutyl acetate to obtain a solution of an acrylic resin having a hydroxyl group and an alkoxysilyl group (A1-1), at a solid concentration of 65 mass %. The alkoxysilyl group content of the obtained acrylic resin having a hydroxyl group and an alkoxysilyl group (A1-1) was 1.2 mmol/g, the hydroxyl value was 151 mgKOH/g, the weight-average molecular weight was 7,000 and the glass transition temperature was 16.6° C.

Production Example 2

In a reactor equipped with a thermometer, thermostat, stirrer, reflux condenser, nitrogen inlet tube and dropper there were charged 30 parts of "SWASOL 1000" (trade name of Cosmo Oil Co., Ltd., aromatic organic solvent) and 10 parts of n-butanol. After stirring the charged liquid while blowing nitrogen gas into the reactor at 125° C., a monomer mixture comprising 1 part of "X-22-174ASX" (trade name of Shin-Etsu Chemical Co., Ltd., group $R^1$ in formula (I): methyl, group X in formula (I): alkyl, group $R^2$ in formula (II): methyl), 30 parts of γ-methacryloxypropyltrimethoxysilane, 35 parts of 2-hydroxypropyl acrylate, 20 parts of styrene, 14 parts of isobutyl methacrylate and 3 parts of 2,2'-azobis(2-methylbutyronitrile) (polymerization initiator) was added dropwise at a uniform rate over a period of 4 hours. After subsequently ageing at 125° C. for 30 minutes, a solution comprising 0.5 part of 2,2'-azobis(2-methylbutyronitrile) and 5.0 parts of "SWASOL 1000" was added dropwise at a uniform rate over a period of 1 hour. The mixture was then aged at 125° C. for 1 hour and cooled, and further diluted by addition of 6 parts of isobutyl acetate to obtain a solution of an acrylic resin having a hydroxyl group and an alkoxysilyl group (A1-2), at a solid concentration of 65 mass %. The alkoxysilyl group content of the obtained acrylic resin having a hydroxyl group and an alkoxysilyl group (A1-2) was 1.2 mmol/g, the hydroxyl value was 151 mgKOH/g, and the weight-average molecular weight was 7,000. The acrylic resin having a hydroxyl group and an alkoxysilyl group (A1-2) has a polydimethylsiloxane structure.

Production of Hydroxyl Group-Containing Acrylic Resin

Production Example 3

In a reactor equipped with a thermometer, thermostat, stirrer, reflux condenser, nitrogen inlet tube and dropper there were charged 30 parts of "SWASOL 1000" (trade name of Cosmo Oil Co., Ltd., aromatic organic solvent) and 10 parts of n-butanol. After stirring the charged liquid while blowing nitrogen gas into the reactor at 125° C., a monomer mixture comprising 35 parts of 2-hydroxypropyl acrylate, 20 parts of styrene, 45 parts of isobutyl methacrylate and 3 parts of 2,2'-azobis(2-methylbutyronitrile) (polymerization initiator) was added dropwise at a uniform rate over a period of 4 hours. After subsequently ageing at 125° C. for 30 minutes, a solution comprising 0.5 part of 2,2'-azobis(2-methylbutyronitrile) and 5.0 parts of "SWASOL 1000" was added dropwise at a uniform rate over a period of 1 hour. After then ageing at 125° C. for 1 hour and cooling, 6 parts of isobutyl acetate was further added for dilution to obtain a hydroxyl group-containing acrylic resin (Ac-1) with a solid concentration of 65 mass %. The hydroxyl value of the obtained hydroxyl group-containing acrylic resin (Ac-1)

was 151 mgKOH/g, the weight-average molecular weight was 7,000 and the glass transition temperature was 36.4° C.

Production of Silica Particles with a Polymerizable Unsaturated Group (c1)

After placing 333 parts of PGM-ST (trade name of Nissan Chemical Industries, Ltd., silica mean primary particle size: 15 nm, silica concentration: 30 mass %, dispersing medium: propyleneglycol monomethyl ether) (100 parts as solid content) and 10 parts of deionized water in a separable flask equipped with a reflux condenser, thermometer and stirrer, 10 parts of KBM-503 (trade name of Shin-Etsu Chemical Co., Ltd., γ-methacryloyloxypropyltrimethoxysilane) was added, and dehydrating condensation reaction was conducted while stirring at 80° C. for 2 hours, after which 0.03 part of tetra-n-butylammonium fluoride was added and reaction was conducted while stirring for 1 hour. Upon completion of the reaction, 30 parts of propyleneglycol monomethyl ether was added, and then the volatile components were distilled off in a reduced pressure state, to obtain silica particles with a polymerizable unsaturated group (c1) dispersion with a solid content of 40% for the surface-modified silica particles.

Production of Dispersion of Acrylic Resin-Coated Silica Particles (C)

Production Example 4

Next, 104.5 parts of propyleneglycol monomethyl ether and 8.5 parts of trimethyl orthoacetate were charged into a separable flask equipped with a reflux condenser, thermometer, stirrer and nitrogen gas inlet, and the temperature was raised to 100° C. under a nitrogen gas stream. After reaching a temperature of 100° C., a monomer mixture comprising 375 parts of the silica particles with a polymerizable unsaturated group (c1) dispersion (solid content: 150 parts), 1 part of "X-22-174ASX" (trade name of Shin-Etsu Chemical Co., Ltd., group $R^1$ in formula (I): methyl, group X in formula (I): alkyl, group $R^2$ in formula (II): methyl), 30 parts of γ-methacryloxypropyltrimethoxysilane, 35 parts of 2-hydroxypropyl acrylate, 20 parts of styrene, 14 parts of isobutyl methacrylate, 3 parts of 2,2'-azobis(2-methylbutyronitrile) (polymerization initiator) and 23.5 parts of trimethyl orthoacetate was added dropwise over a period of 2 hours. The mixture was then aged at 100° C. for 1 hour, after which a mixed solution of 1 part of 2,2'-azobis(2-methylbutyronitrile) (polymerization initiator) and 19.5 parts of propyleneglycol monomethyl ether was loaded in and the mixture was further aged for 2 hours. The polymerization rate was 99% as determined from the nonvolatile content. Propyleneglycol monomethyl ether was added and the solvent was exchanged by azeotropic distillation in a reduced pressure state, to obtain a dispersion of acrylic resin-coated silica particles (C-1) having a measured nonvolatile content of 40%.

Production Examples 5 to 26

Acrylic resin-coated silica particles (C-2) to (C-23) were obtained in the same manner as Production Example 4, except for using the compositions listed in Table 1 to Table 4.

TABLE 1

| | | | Production Example No. | | | | | |
|---|---|---|---|---|---|---|---|---|
| | | | 4 | 5 | 6 | 7 | 8 | 9 |
| Dispersion of acrylic resin-coated silica particles (C) | | | C-1 | C-2 | C-3 | C-4 | C-5 | C-6 |
| Silica particles with polymerizable unsaturated group (c1) | | | 150 | 150 | 150 | 150 | 150 | 150 |
| Polymerizable unsaturated monomer mixture (c2) | Polymerizable unsaturated monomer with polysiloxane structure (c21) | X-22-174ASX | 1 | | | | | |
| | | X-22-174BX | | 1 | | | | |
| | | KF-2012 | | | 1 | | | |
| | | X-22-2404 | | | | 1 | | |
| | | X-22-164AS | | | | | 1 | |
| | | X-22-164B | | | | | | 1 |
| | Polymerizable unsaturated monomer with alkoxysilyl group (c22) | γ-Methacryloxypropyltrimethoxysilane | 30 | 30 | 30 | 30 | 30 | 30 |
| | Other polymerizable unsaturated monomer (c23) | Hydroxyl group-containing unsaturated monomer | 2-Hydroxypropyl acrylate | 35 | 35 | 35 | 35 | 35 | 35 |
| | | Styrene | 20 | 20 | 20 | 20 | 20 | 20 |
| | | Isobutyl methacrylate | 14 | 14 | 14 | 14 | 14 | 14 |
| Initiator | 2,2'-Azobis(2-methylbutyronitrile) | | 4 | 4 | 4 | 4 | 4 | 4 |
| Solvent | Propyleneglycol monomethyl ether | | 349 | 349 | 349 | 349 | 349 | 349 |
| Dehydrating agent | Trimethyl orthoacetate | | 32 | 32 | 32 | 32 | 32 | 32 |
| Number-average molecular weight of (c21) | | | 900 | 2400 | 4600 | 420 | 450 | 1600 |
| Hydroxyl value of resin covering silica particles (mgKOH/g) | | | 151 | 151 | 151 | 151 | 151 | 151 |
| Alkoxysilyl group content of resin covering silica particles (mmol/g) | | | 1.2 | 1.2 | 1.2 | 1.2 | 1.2 | 1.2 |
| (c1):(c2) ratio | | | 60/40 | 60/40 | 60/40 | 60/40 | 60/40 | 60/40 |

Note: "Other polymerizable unsaturated monomer (c23)" row for 2-Hydroxypropyl acrylate is in the "Hydroxyl group-containing unsaturated monomer" subgroup.

TABLE 2

|  |  |  | \multicolumn{7}{c|}{Production Example No.} |
|---|---|---|---|---|---|---|---|---|---|
|  |  |  | 10 | 11 | 12 | 13 | 14 | 15 | 16 |
| \multicolumn{3}{|l|}{Dispersion of acrylic resin-coated silica particles (C)} | C-7 | C-8 | C-9 | C-10 | C-11 | C-12 | C-13 |
| \multicolumn{3}{|l|}{Silica particles with polymerizable unsaturated group (c1)} | 150 | 150 | 150 | 150 | 150 | 42.9 | 400 |
| Polymerizable unsaturated monomer mixture (c2) | Polymerizable unsaturated monomer with polysiloxane structure (c21) | X-22-174ASX X-22-174BX KF-2012 X-22-2404 X-22-164AS X-22-164B | 1 | 1 | 1 | 1 | 1 | 1 | 1 |
|  | Polymerizable unsaturated monomer with alkoxysilyl group (c22) | γ-Methacryloxypropyltrimethoxysilane | 7.5 | 25 | 45 | 30 | 30 | 30 | 30 |
|  | Other polymerizable unsaturated monomer (c23) | Hydroxyl group-containing unsaturated monomer — 2-Hydroxypropyl acrylate | 35 | 35 | 35 | 29 | 42 | 35 | 35 |
|  |  | Styrene | 20 | 20 | 19 | 20 | 20 | 20 | 20 |
|  |  | Isobutyl methacrylate | 36.5 | 19 | 0 | 20 | 7 | 14 | 14 |
| Initiator |  | 2,2'-Azobis(2-methylbutyronitrile) | 4 | 4 | 4 | 4 | 4 | 4 | 4 |
| Solvent |  | Propyleneglycol monomethyl ether | 349 | 349 | 349 | 349 | 349 | 201.8 | 692.5 |
| Dehydrating agent |  | Trimethyl orthoacetate | 32 | 32 | 32 | 32 | 32 | 18.5 | 63.5 |
| \multicolumn{3}{|l|}{Number-average molecular weight of (c21)} | 900 | 900 | 900 | 900 | 900 | 900 | 900 |
| \multicolumn{3}{|l|}{Hydroxyl value of resin covering silica particles (mgKOH/g)} | 151 | 151 | 151 | 125 | 181 | 151 | 151 |
| \multicolumn{3}{|l|}{Alkoxysilyl group content of resin covering silica particles (mmol/g)} | 0.3 | 1 | 1.8 | 1.2 | 1.2 | 1.2 | 1.2 |
| \multicolumn{3}{|l|}{(c1):(c2) ratio} | 60/40 | 60/40 | 60/40 | 60/40 | 60/40 | 30/70 | 80/20 |

TABLE 3

|  |  |  | \multicolumn{6}{c|}{Production Example No.} |
|---|---|---|---|---|---|---|---|---|
|  |  |  | 17 | 18 | 19 | 20 | 21 | 22 |
| \multicolumn{3}{|l|}{Dispersion of acrylic resin-coated silica particles (C)} | C-14 | C-15 | C-16 | C-17 | C-18 | C-19 |
| \multicolumn{3}{|l|}{Silica particles with polymerizable unsaturated group (c1)} | 150 | 150 | 150 | 150 | 11.1 | 1900 |
| Polymerizable unsaturated monomer mixture (c2) | Polymerizable unsaturated monomer with polysiloxane structure (c21) | X-22-174ASX X-22-174BX KF-2012 X-22-2404 X-22-164AS X-22-164B | 1 | 1 | 1 | 1 | 1 | 1 |
|  | Polymerizable unsaturated monomer with alkoxysilyl group (c22) | γ-Methacryloxypropyltrimethoxysilane | 3 | 62 | 30 | 30 | 30 | 30 |
|  | Other polymerizable unsaturated monomer (c23) | Hydroxyl group-containing unsaturated monomer — 2-Hydroxypropyl acrylate | 35 | 35 | 26 | 52 | 35 | 35 |
|  |  | Styrene | 20 | 2 | 20 | 17 | 20 | 20 |
|  |  | Isobutyl methacrylate | 41 | 0 | 23 | 0 | 14 | 14 |
| Initiator |  | 2,2'-Azobis(2-methylbutyronitrile) | 4 | 4 | 4 | 4 | 4 | 4 |
| Solvent |  | Propyleneglycol monomethyl ether | 349 | 349 | 349 | 349 | 158.1 | 2753.5 |
| Dehydrating agent |  | Trimethyl orthoacetate | 32 | 32 | 32 | 32 | 14.5 | 252.5 |
| \multicolumn{3}{|l|}{Number-average molecular weight of (c21)} | 900 | 900 | 900 | 900 | 900 | 900 |
| \multicolumn{3}{|l|}{Hydroxyl value of resin covering silica particles (mgKOH/g)} | 151 | 151 | 112 | 224 | 151 | 151 |
| \multicolumn{3}{|l|}{Alkoxysilyl group content of resin covering silica particles (mmol/g)} | 0.1 | 2.5 | 1.2 | 1.2 | 1.2 | 1.2 |
| \multicolumn{3}{|l|}{(c1):(c2) ratio} | 60/40 | 60/40 | 60/40 | 60/40 | 10/90 | 95/5 |

TABLE 4

|  |  |  | Production Example No. | | | |
|---|---|---|---|---|---|---|
|  |  |  | 23 | 24 | 25 | 26 |
| Dispersion of acrylic resin-coated silica particles (C) | | | C-20 | C-21 | C-22 | C-23 |
| Silica particles with polymerizable unsaturated group (c1) | | | 150 | 150 | 150 | 150 |
| Polymerizable unsaturated monomer mixture (c2) | Polymerizable unsaturated monomer with polysiloxane structure (c21) | X-22-174ASX | 1 | | 1 | |
| | | X-22-174BX | | | | |
| | | KF-2012 | | | | |
| | | X-22-2404 | | | | |
| | | X-22-164AS | | | | |
| | | X-22-164B | | | | |
| | Polymerizable unsaturated monomer with alkoxysilyl group (c22) | γ-Methacryloxypropyltrimethoxysilane | 30 | 30 | | |
| | Other polymerizable unsaturated monomer (c23) | Hydroxyl group-containing unsaturated monomer | 2-Hydroxypropyl acrylate | 35 | 35 | 35 | 35 |
| | | Styrene | 20 | 20 | 20 | 20 |
| | | Isobutyl methacrylate | 14 | 15 | 44 | 45 |
| Initiator | 2,2'-Azobis(2-methylbutyronitrile) | | 4 | 4 | 4 | 4 |
| Solvent | Propyleneglycol monomethyl ether | | 381 | 349 | 349 | 349 |
| Dehydrating agent | Trimethyl orthoacetate | | | 32 | 32 | 32 |
| Number-average molecular weight of (c21) | | | 900 | 900 | 900 | 900 |
| Hydroxyl value of resin covering silica particles (mgKOH/g) | | | 151 | 151 | 151 | 151 |
| Alkoxysilyl group content of resin covering silica particles (mmol/g) | | | 1.2 | 1.2 | 0 | 0 |
| (c1):(c2) ratio | | | 60/40 | 60/40 | 60/40 | 60/40 |

The components (c21) in the tables are as follows.

"X-22-174BX": trade name of Shin-Etsu Chemical Co., Ltd., group $R^1$ in formula (I): methyl, group X in formula (I): alkyl, group $R^2$ in formula (II): methyl, group $R^3$ in formula (II): alkylene, "KF-2012": trade name of Shin-Etsu Chemical Co., Ltd., group $R^1$ in formula (I): methyl, group X in formula (I): alkyl, group $R^2$ in formula (II): methyl, group $R^3$ in formula (II): alkylene, "X-22-2404": trade name of Shin-Etsu Chemical Co., Ltd., group $R^1$ in formula (I): methyl, group X in formula (I): alkyl, group $R^2$ in formula (II): methyl, group $R^3$ in formula (II): alkylene, "X-22-164AS": trade name of Shin-Etsu Chemical Co., Ltd., group $R^1$ in formula (I): methyl, group X in formula (I): methacryl, group $R^2$ in formula (II): methyl, group $R^3$ in formula (II): alkylene, "X-22-164B": trade name of Shin-Etsu Chemical Co., Ltd., group $R^1$ in formula (I): methyl, group X in formula (I): methacryl, group $R^2$ in formula (II): methyl, group $R^3$ in formula (II): alkylene group.

Production of Coating Composition

Example 1

After combining 25 parts of the dispersion of acrylic resin-coated silica particles (C-1) obtained in Production Example 4 (solid content: 10 parts), 92.3 parts of the acrylic resin having a hydroxyl group and an alkoxysilyl group (A-1) obtained in Production Example 1 (solid content: 60 parts), 30 parts of "SUMIDUR N3300" (trade name of Sumika Covestro Urethane Co., Ltd., hexamethylene diisocyanate isocyanurate ring addition product, solid content: 100%) (solid content: 30 parts), 4 parts of "NACURE 4167" (trade name of King Industries Co., triethylamine salt of alkylphosphoric acid, curing catalyst, 25% active ingredient) (solid content: 1 part), 0.2 part of "BYK-300" (trade name of Byk-Chemie Corp., surface control agent, 52% active ingredient) (solid content: 0.1 part), 1 part of "TINUVIN 400" (trade name of BASF Corp., benzotriazole-based ultraviolet absorber, 100% active ingredient) (solid content: 1 part) and 1 part of "HOSTAVIN 3058" (trade name of Clariant Corp., hindered amine-based light stabilizer, acylated hindered amine, 100% active ingredient) (solid content: 1 part), the mixture was diluted and stirred with butyl acetate to a coating material solid content of 40% to obtain coating composition No. 1.

Examples 2 to 26 and Comparative Examples 1 to 4

Coating compositions No. 2 to 30 were obtained in the same manner as Example 1, except that the compositions were as shown in Table 5 to Table 9.

The curing agents (B) in the tables are as follows.

"DESMODUR Z4470BA": trade name of Sumika Covestro Urethane Co., Ltd., isophorone diisocyanate trimer, solid content: 70%, "CYMEL 251": trade name of Allnex, Japan, melamine resin.

Fabrication of Test Sheets for Decontamination Property Test

The viscosity of each of coating compositions No. 1 to 30 was adjusted to a viscosity of 25 seconds at 20° C. using a Ford cup No. 4, by addition of butyl acetate, to fabricate test sheets in the following manner.

A 0.8 mm-thick dull steel sheet chemically treated with zinc phosphate was electrodeposited with ELECRON GT-10 (thermosetting epoxy resin-based cationic electrodeposition coating material, trade name of Kansai Paint Co., Ltd.) to a film thickness of 20 μm and heated at 170° C. for 30 minutes to hardening, and then AMYLAC TP-65-2 (polyester/melamine resin-based automobile intermediate coating material, trade name of Kansai Paint Co., Ltd.) was air spray coated over to a film thickness of 35 μm and heated at 140° C. for 30 minutes for hardening. The aqueous base coating material composition "WBC713T" (trade name of Kansai Paint Co., Ltd., acrylmelamine resin-based overcoat base coating material for automobiles, white) was applied onto the coated film to a dry film thickness of 15 μm, and after allowing it to stand for 5 minutes at room temperature, preheating was carried out for 10 minutes at 80° C., and the sheet was then heat cured at 140° C. for 30 minutes. The cured base coating film was subsequently coated with the different coating compositions that had been produced and viscosity-adjusted in the Examples and Comparative Examples, each to a film thickness of 35 μm, and allowed to stand at room temperature for 10 minutes, after which they were hardened by heating at 80° C. for 20 minutes, to obtain test sheets. Each of the obtained test sheets was allowed to stand at ordinary temperature for 7 days and then subjected to the following film performance test. The test results are shown in Table 5 to Table 9.

Decontamination Properties

Each of the obtained test sheets was contaminated by drawing a 10 mm×10 mm square using an alcohol-based marker "Mckee EXTEA FINE MO-120-MC-R" (trade name of Zebra Co., Ltd., red alcohol-based marker). After standing for 6 days, it was thoroughly wiped with "SCOTCH-BRITE CITRUS FOAM CLEANER" (trade name of 3M Company, graffiti removing agent), a dried Kimwipe (trade name) was used to wipe off the contaminated portions, and the sheet was allowed to stand for 1 day, observing those portions and evaluating them on the following scale. A, B and C are acceptable levels.

A: Easily removable with cleaner, absolutely no color residue,
B: Repeated wiping with cleaner resulted in virtually no color residue,
C: Repeated wiping with cleaner resulted in slight visible color residue,
D: Unable to wipe with cleaner, visible color residue,
E: Visible color residue, coating film dissolved with cleaner.

Fabrication of Test Sheets for Scratch Resistance and Transparency Testing

The viscosity of each of coating compositions No. 1 to 30 was adjusted to a viscosity of 25 seconds at 20° C. using a Ford cup No. 4, by addition of butyl acetate, to fabricate test sheets in the following manner.

A 0.8 mm-thick dull steel sheet chemically treated with zinc phosphate was electrodeposited with ELECRON GT-10 (thermosetting epoxy resin-based cationic electrodeposition coating material, trade name of Kansai Paint Co., Ltd.) to a film thickness of 20 μm and heated at 170° C. for 30 minutes to hardening, and then AMYLAC TP-65-2 (polyester/melamine resin-based automobile intermediate coating material, trade name of Kansai Paint Co., Ltd.) was air spray coated over to a film thickness of 35 μm and heated at 140° C. for 30 minutes for hardening. The aqueous base coating material composition "WBC713T" (trade name of Kansai Paint Co., Ltd., acrylmelamine resin-based overcoat base coating material for automobiles, black) was applied onto the coated film to a dry film thickness of 15 μm, and after allowing it to stand for 5 minutes at room temperature, preheating was carried out for 10 minutes at 80° C. and the sheet was then heat cured at 140° C. for 30 minutes. The cured base coating film was subsequently coated with the different coating compositions that had been produced and viscosity-adjusted in the Examples and Comparative Examples, each to a film thickness of 35 μm, and allowed to stand at room temperature for 10 minutes, after which they were hardened by heating at 80° C. for 20 minutes, to obtain test sheets. Each of the obtained test sheets was allowed to stand at ordinary temperature for 7 days and then subjected to the following film performance test.

Scratch Resistance

Each of the obtained test sheets was subjected to 10 passes using a Gakushin-type friction tester (Crock Meter M238BB CM-5 by SDL ATLAS Co.). The polishing agent used was a "281Q Wet-or-Dry Polishing Sheet, particle size: 9 μm" (trade name of 3M, polishing agent). After the test, and after air spraying the coating film surface, the 20° gloss before and after the test was measured using a gloss meter (Micro Tri Gross by Byk-Gardner), calculating the gloss retention by the following formula. A, B and C are acceptable levels.

[Gloss after test/initial gloss]×100

A: ≥85%,
B: ≥80 and <85%,
C: ≥65 and <80%,
D: ≥50 and <65%,
E: <50%.

Transparency

Each of the obtained test sheets was evaluated for transparency based on the L* value measured with a "CM-512m3" (trade name of Konica Minolta Inc., multi-angle spectrocolorimeter). The L* value in this test is the total of each of the L* values for standard D65 light irradiated from the 3 angles of 25° (highlight direction), 45° and 75° (shade direction) with respect to the acceptance angle (with the direction perpendicular to the coating surface as) 0°). A smaller L* value represents clearer visibility of black on the lower base coating film, and higher transparency of the formed clear coating film. A, B and C are acceptable levels.

A: Total L* value of <1.5,
B: Total L* value of ≥1.5 and <2.0,
C: Total L* value of ≥2.0 and <2.5,
D: Total L* value of ≥2.5 and <3.5,
E: Total L* value of ≥3.5.

TABLE 5

|  | Example | | | | | |
|---|---|---|---|---|---|---|
|  | 1 | 2 | 3 | 4 | 5 | 6 |
| Coating composition name | 1 | 2 | 3 | 4 | 5 | 6 |
| Acrylic resin with hydroxyl group and alkoxy silyl group (A1-1) | 60 | 60 | 60 | 60 | 60 | 60 |
| Acrylic resin with hydroxyl group and alkoxy silyl group (A1-2) | | | | | | |

TABLE 5-continued

|  |  | Example | | | | | |
|---|---|---|---|---|---|---|---|
|  |  | 1 | 2 | 3 | 4 | 5 | 6 |
| Hydroxyl-containing acrylic resin (Ac-1) |  |  |  |  |  |  |  |
| Curing agent (B) | Polyisocyanate compound (B1) SUMIDUR N3300 DESMODUR Z4470BA | 30 | 30 | 30 | 30 | 30 | 30 |
|  | Melamine resin (B2) CYMEL 251 |  |  |  |  |  |  |
| Dispersion of acrylic resin-coated silica particles (C) | Type | C-1 | C-2 | C-3 | C-4 | C-5 | C-6 |
|  | Amount | 10 | 10 | 10 | 10 | 10 | 10 |
| Catalyst | NACURE4167 | 1 | 1 | 1 | 1 | 1 | 1 |
| Surface control agent | BYK-300 | 0.1 | 0.1 | 0.1 | 0.1 | 0.1 | 0.1 |
| Ultraviolet absorber | TINUVIN 400 | 1 | 1 | 1 | 1 | 1 | 1 |
| Light stabilizer | HOSTAVIN 3058 | 1 | 1 | 1 | 1 | 1 | 1 |
| Performance | Decontamination property | A | A | A | B | B | B |
|  | Scratch resistance | A | A | B | B | B | A |
|  | Transparency | A | B | C | A | A | B |

TABLE 6

|  |  | Example | | | | | | |
|---|---|---|---|---|---|---|---|---|
|  |  | 7 | 8 | 9 | 10 | 11 | 12 | 13 |
| Coating composition name |  | 7 | 8 | 9 | 10 | 11 | 12 | 13 |
| Acrylic resin with hydroxyl group and alkoxy silyl group (A1-1) |  | 60 | 60 | 60 | 60 | 60 | 60 | 60 |
| Acrylic resin with hydroxyl group and alkoxy silyl group (A1-2) |  |  |  |  |  |  |  |  |
| Hydroxyl-containing acrylic resin (Ac-1) |  |  |  |  |  |  |  |  |
| Curing agent (B) | Polyisocyanate compound (B1) SUMIDUR N3300 DESMODUR Z4470BA | 30 | 30 | 30 | 30 | 30 | 30 | 30 |
|  | Melamine resin (B2) CYMEL 251 |  |  |  |  |  |  |  |
| Dispersion of acrylic resin-coated silica particles (C) | Type | C-7 | C-8 | C-9 | C-10 | C-11 | C-12 | C-13 |
|  | Amount | 10 | 10 | 10 | 10 | 10 | 10 | 10 |
| Catalyst | NACURE4167 | 1 | 1 | 1 | 1 | 1 | 1 | 1 |
| Surface control agent | BYK-300 | 0.1 | 0.1 | 0.1 | 0.1 | 0.1 | 0.1 | 0.1 |
| Ultraviolet absorber | TINUVIN 400 | 1 | 1 | 1 | 1 | 1 | 1 | 1 |
| Light stabilizer | HOSTAVIN 3058 | 1 | 1 | 1 | 1 | 1 | 1 | 1 |
| Performance | Decontamination property | B | A | A | B | A | A | B |
|  | Scratch resistance | B | A | B | B | A | B | A |
|  | Transparency | B | A | A | A | A | A | B |

TABLE 7

|  |  | Example | | | | | |
|---|---|---|---|---|---|---|---|
|  |  | 14 | 15 | 16 | 17 | 18 | 19 |
| Coating composition name |  | 14 | 15 | 16 | 17 | 18 | 19 |
| Acrylic resin with hydroxyl group and alkoxy silyl group (A1-1) |  | 60 | 60 | 60 | 60 | 60 | 60 |
| Acrylic resin with hydroxyl group and alkoxy silyl group (A1-2) |  |  |  |  |  |  |  |
| Hydroxyl-containing acrylic resin (Ac-1) |  |  |  |  |  |  |  |
| Curing agent (B) | Polyisocyanate compound (B1) SUMIDUR N3300 DESMODUR Z4470BA | 30 | 30 | 30 | 30 | 30 | 30 |
|  | Melamine resin CYMEL 251 (B2) |  |  |  |  |  |  |

TABLE 7-continued

|  |  | Example | | | | | |
|---|---|---|---|---|---|---|---|
|  |  | 14 | 15 | 16 | 17 | 18 | 19 |
| Dispersion of acrylic resin-coated silica particles (C) | Type | C-14 | C-15 | C-16 | C-17 | C-18 | C-19 |
|  | Amount | 10 | 10 | 10 | 10 | 10 | 10 |
| Catalyst | NACURE4167 | 1 | 1 | 1 | 1 | 1 | 1 |
| Surface control agent | BYK-300 | 0.1 | 0.1 | 0.1 | 0.1 | 0.1 | 0.1 |
| Ultraviolet absorber | TINUVIN 400 | 1 | 1 | 1 | 1 | 1 | 1 |
| Light stabilizer | HOSTAVIN 3058 | 1 | 1 | 1 | 1 | 1 | 1 |
| Performance | Decontamination property | B | B | B | B | B | C |
|  | Scratch resistance | C | B | C | A | C | A |
|  | Transparency | B | B | B | A | A | C |

TABLE 8

|  |  | Example | | | | | | |
|---|---|---|---|---|---|---|---|---|
|  |  | 20 | 21 | 22 | 23 | 24 | 25 | 26 |
| Coating composition name |  | 20 | 21 | 22 | 23 | 24 | 25 | 26 |
| Acrylic resin with hydroxyl group and alkoxysilyl group (A1-1) |  | 60 |  | 60 | 63 | 56 | 53 | 60 |
| Acrylic resin with hydroxyl group and alkoxysilyl group (A1-2) |  |  | 60 |  |  |  |  |  |
| Hydroxyl-containing acrylic resin (Ac-1) |  |  |  |  |  |  |  |  |
| Curing agent (B) | Polyisocyanate compound (B1) SUMIDUR N3300 | 30 | 30 |  | 32 | 28 |  | 25 |
|  | DESMODUR Z4470BA |  |  |  |  |  | 37 |  |
|  | Melamine resin (B2) CYMEL 251 |  |  | 30 |  |  |  | 5 |
| Dispersion of acrylic resin-coated silica particles (C) | Type | C-20 | C-1 | C-1 | C-1 | C-1 | C-1 | C-1 |
|  | Amount | 10 | 10 | 10 | 5 | 16 | 10 | 10 |
| Catalyst | NACURE4167 | 1 | 1 | 1 | 1 | 1 | 1 | 1 |
| Surface control agent | BYK-300 | 0.1 | 0.1 | 0.1 | 0.1 | 0.1 | 0.1 | 0.1 |
| Ultraviolet absorber | TINUVIN 400 | 1 | 1 | 1 | 1 | 1 | 1 | 1 |
| Light stabilizer | HOSTAVIN 3058 | 1 | 1 | 1 | 1 | 1 | 1 | 1 |
| Performance | Decontamination property | C | C | B | A | B | A | A |
|  | Scratch resistance | C | C | A | B | A | B | A |
|  | Transparency | B | A | A | A | B | A | B |

TABLE 9

|  |  | Comparative Examples | | | |
|---|---|---|---|---|---|
|  |  | 1 | 2 | 3 | 4 |
| Coating composition name |  | 27 | 28 | 29 | 30 |
| Acrylic resin with hydroxyl group and alkoxysilyl group (A1-1) |  |  | 60 | 60 | 60 |
| Acrylic resin with hydroxyl group and alkoxysilyl group (A1-2) |  |  |  |  |  |
| Hydroxyl-containing acrylic resin (Ac-1) |  | 60 |  |  |  |
| Curing agent (B) | Polyisocyanate compound (B1) SUMIDUR N3300 DESMODUR Z4470BA | 30 | 30 | 30 | 30 |
|  | Melamine resin (B2) CYMEL 251 |  |  |  |  |
| Dispersion of acrylic resin-coated silica particles (C) | Type | C-1 | C-21 | C-22 | C-23 |
|  | Amount | 10 | 10 | 10 | 10 |
| Catalyst | NACURE4167 | 1 | 1 | 1 | 1 |
| Surface control agent | BYK-300 | 0.1 | 0.1 | 0.1 | 0.1 |
| Ultraviolet absorber | TINUVIN 400 | 1 | 1 | 1 | 1 |
| Light stabilizer | HOSTAVIN 3058 | 1 | 1 | 1 | 1 |
| Performance | Decontamination property | D | C | B | E |
|  | Scratch resistance | B | D | D | D |
|  | Transparency | C | B | C | E |

Fabrication of Test Articles to be Coated Using Low-Temperature-Curing Base Coating Material A 0.8 mm-thick dull steel sheet chemically treated with zinc phosphate was electrodeposited with ELECRON GT-10 (thermosetting epoxy resin-based cationic electrodeposition coating material, trade name of Kansai Paint Co., Ltd.) to a film thickness of 20 μm and heated at 170° C. for 30 minutes to hardening, and then AMYLAC TP-65-2 (polyester/melamine resin-based automobile intermediate coating material, trade name of Kansai Paint Co., Ltd.) was air spray coated over to a film thickness of 35 μm and heated at 140° C. for 30 minutes for hardening. The aqueous base coating material composition "ASCALEX 200H" (trade name of Kansai Paint Co., Ltd., acryl/melamine/blocked isocyanate resin-based overcoat base coating material for automobiles, white) was applied onto the coated film to a dry film thickness of 15 μm, and after allowing it to stand for 5 minutes at room temperature, preheating was carried out for 3 minutes at 80° C., and the sheet was then heat cured at 80° C. for 30 minutes to obtain a test article to be coated (L1).

A 0.8 mm-thick dull steel sheet chemically treated with zinc phosphate was electrodeposited with ELECRON GT-10 (thermosetting epoxy resin-based cationic electrodeposition coating material, trade name of Kansai Paint Co., Ltd.) to a film thickness of 20 μm and heated at 170° C. for 30 minutes to hardening, and then AMYLAC TP-65-2 (polyester/melamine resin-based automobile intermediate coating material, trade name of Kansai Paint Co., Ltd.) was air spray coated over to a film thickness of 35 μm and heated at 140° C. for 30 minutes for hardening. The aqueous base coating material composition "ASCALEX 200H" (trade name of Kansai Paint Co., Ltd., acryl/melamine/blocked isocyanate resin-based overcoat base coating material for automobiles, black) was applied onto the coated film to a dry film thickness of 15 μm, and after allowing it to stand for 5 minutes at room temperature, preheating was carried out for 3 minutes at 80° C., and the sheet was then heat cured at 80° C. for 30 minutes to obtain a test article to be coated (L2).

A 0.8 mm-thick dull steel sheet chemically treated with zinc phosphate was electrodeposited with ELECRON GT-10 (thermosetting epoxy resin-based cationic electrodeposition coating material, trade name of Kansai Paint Co., Ltd.) to a film thickness of 20 μm and heated at 170° C. for 30 minutes to hardening, and then AMYLAC TP-65-2 (polyester/melamine resin-based automobile intermediate coating material, trade name of Kansai Paint Co., Ltd.) was air spray coated over to a film thickness of 35 μm and heated at 140° C. for 30 minutes for hardening. The aqueous base coating material composition "ASCALEX 200H" (trade name of Kansai Paint Co., Ltd., acryl/melamine/blocked isocyanate resin-based overcoat base coating material for automobiles, white) was applied onto the coated film to a dry film thickness of 15 μm, and after allowing it to stand for 5 minutes at room temperature, preheating was carried out for 3 minutes at 80° C. to form an uncured base coating film, to obtain a test article to be coated (L3).

A 0.8 mm-thick dull steel sheet chemically treated with zinc phosphate was electrodeposited with ELECRON GT-10 (thermosetting epoxy resin-based cationic electrodeposition coating material, trade name of Kansai Paint Co., Ltd.) to a film thickness of 20 μm and heated at 170° C. for 30 minutes to hardening, and then AMYLAC TP-65-2 (polyester/melamine resin-based automobile intermediate coating material, trade name of Kansai Paint Co., Ltd.) was air spray coated over to a film thickness of 35 μm and heated at 140° C. for 30 minutes for hardening. The aqueous base coating material composition "ASCALEX 200H" (trade name of Kansai Paint Co., Ltd., acryl/melamine/blocked isocyanate resin-based overcoat base coating material for automobiles, black) was applied onto the coated film to a dry film thickness of 15 μm, and after allowing it to stand for 5 minutes at room temperature, preheating was carried out for 3 minutes at 80° C. to form an uncured base coating film, to obtain a test article to be coated (L4).

A 0.8 mm-thick dull steel sheet chemically treated with zinc phosphate was electrodeposited with ELECRON GT-10 (thermosetting epoxy resin-based cationic electrodeposition coating material, trade name of Kansai Paint Co., Ltd.) to a film thickness of 20 μm and heated at 170° C. for 30 minutes to hardening, and then "WP-522H" (polyester resin-based aqueous intermediate coating material, trade name of Kansai Paint Co., Ltd.) was air spray coated over to a film thickness of 30 μm to form an uncured intermediate coating film. The aqueous base coating material composition "ASCALEX 200H" (trade name of Kansai Paint Co., Ltd., acryl/melamine/blocked isocyanate resin-based overcoat base coating material for automobiles, white) was applied onto the coated film to a dry film thickness of 15 μm, and after allowing it to stand for 5 minutes at room temperature, preheating was carried out for 3 minutes at 80° C. to form an uncured base coating film, to obtain a test article to be coated (L5).

A 0.8 mm-thick dull steel sheet chemically treated with zinc phosphate was electrodeposited with ELECRON GT-10 (thermosetting epoxy resin-based cationic electrodeposition coating material, trade name of Kansai Paint Co., Ltd.) to a film thickness of 20 μm and heated at 170° C. for 30 minutes to hardening, and then "WP-522H" (polyester resin-based aqueous intermediate coating material, trade name of Kansai Paint Co., Ltd.) was air spray coated over to a film thickness of 30 μm to form an uncured intermediate coating film. The aqueous base coating material composition "ASCALEX 200H" (trade name of Kansai Paint Co., Ltd., acryl/melamine/blocked isocyanate resin-based overcoat base coating material for automobiles, black) was applied onto the coated film to a dry film thickness of 15 μm, and after allowing it to stand for 5 minutes at room temperature, preheating was carried out for 3 minutes at 80° C. to form an uncured base coating film, to obtain a test article to be coated (L6).

Fabrication of Test Sheets Using Low-Temperature-Curing Base Coating Materials

Example 27

The viscosity of coating composition No. 1 was adjusted to a viscosity of 25 seconds at 20° C. using a Ford cup No. 4 with addition of butyl acetate. The viscosity-adjusted coating composition No. 1 was then applied onto each of the test articles to be coated (L1), (L2), (L3), (L4), (L5) and (L6) to a film thickness of 35 μm, and after standing at room temperature for 10 minutes, it was heated at 80° C. for 20 minutes for curing and then left to stand at 23° C. for 7 days, to obtain test coated sheets (L1-1), (L2-1), (L3-1), (L4-1), (L5-1) and (L6-1).

Examples 28 to 52 and Comparative Examples 5 to 8

Test coated sheets (L1-2) to (L1-30), (L2-2) to (L2-30), (L3-2) to (L3-30), (L4-2) to (L4-30), (L5-2) to (L5-30) and (L6-2) to (L6-30) were obtained in the same manner as Example 27, except for changing the coating composition type in Example 27 as shown in Table 10 to Table 14.

Coated Film Performance Test

Of the test sheets that were obtained, test sheets (L1-1) to (L1-30), (L3-1) to (L3-30) and (L5-1) to (L5-30) were subjected to evaluation testing for decontamination properties. Test sheets (L2-1) to (L2-30), (L4-1) to (L4-30) and (L6-1) to (L6-30) were used for evaluation testing of scratch resistance and transparency. The evaluation results are shown in Table 10 to Table 14.

TABLE 10

| | | | Example | | | | | |
|---|---|---|---|---|---|---|---|---|
| | | | 27 | 28 | 29 | 30 | 31 | 32 |
| | Coating composition No. | | 1 | 2 | 3 | 4 | 5 | 6 |
| Performance | Test sheet (L1) | Test sheet name | (L1-1) | (L1-2) | (L1-3) | (L1-4) | (L1-5) | (L1-6) |
| | | Decontamination property | A | A | A | B | B | B |
| | Test sheet (L2) | Test sheet name | (L2-1) | (L2-2) | (L2-3) | (L2-4) | (L2-5) | (L2-6) |
| | | Scratch resistance | A | A | B | B | B | A |
| | | Transparency | A | B | C | A | A | B |
| | Test sheet (L3) | Test sheet name | (L3-1) | (L3-2) | (L3-3) | (L3-4) | (L3-5) | (L3-6) |
| | | Decontamination property | A | A | A | B | B | B |
| | Test sheet (L4) | Test sheet name | (L4-1) | (L4-2) | (L4-3) | (L4-4) | (L4-5) | (L4-6) |
| | | Scratch resistance | A | A | B | B | B | A |
| | | Transparency | A | B | C | A | A | B |
| | Test sheet (L5) | Test sheet name | (L5-1) | (L5-2) | (L5-3) | (L5-4) | (L5-5) | (L5-6) |
| | | Decontamination property | A | A | A | B | B | B |
| | Test sheet (L6) | Test sheet name | (L6-1) | (L6-2) | (L6-3) | (L6-4) | (L6-5) | (L6-6) |
| | | Scratch resistance | A | A | B | B | B | A |
| | | Transparency | A | B | C | A | A | B |

TABLE 11

| | | | 33 | 34 | 35 | 36 | 37 | 38 | 39 |
|---|---|---|---|---|---|---|---|---|---|
| | Coating composition No. | | 7 | 8 | 9 | 10 | 11 | 12 | 13 |
| Performance | Test sheet (L1) | Test sheet name | (L1-7) | (L1-8) | (L2-9) | (L1-10) | (L1-11) | (L1-12) | (L1-13) |
| | | Decontamination property | B | A | A | B | A | A | B |
| | Test sheet (L2) | Test sheet name | (L2-7) | (L2-8) | (L2-9) | (L2-10) | (L2-11) | (L2-12) | (L2-13) |
| | | Scratch resistance | B | A | B | B | A | B | A |
| | | Transparency | B | A | A | A | A | A | B |
| | Test sheet (L3) | Test sheet name | (L3-7) | (L3-8) | (L3-9) | (L3-10) | (L3-11) | (L3-12) | (L3-13) |
| | | Decontamination property | B | A | A | B | A | A | B |
| | Test sheet (L4) | Test sheet name | (L4-7) | (L4-8) | (L4-9) | (L4-10) | (L4-11) | (L4-12) | (L4-13) |
| | | Scratch resistance | B | A | B | B | A | B | A |
| | | Transparency | B | A | A | A | A | A | B |
| | Test sheet (L5) | Test sheet name | (L5-7) | (L5-8) | (L5-9) | (L5-10) | (L5-11) | (L5-12) | (L5-13) |
| | | Decontamination property | B | A | A | B | A | A | B |
| | Test sheet (L6) | Test sheet name | (L6-7) | (L6-8) | (L6-9) | (L6-10) | (L6-11) | (L6-12) | (L6-13) |
| | | Scratch resistance | B | A | B | B | A | B | A |
| | | Transparency | B | A | A | A | A | A | B |

TABLE 12

| | | | 40 | 41 | 42 | 43 | 44 | 45 |
|---|---|---|---|---|---|---|---|---|
| | Coating composition No. | | 14 | 15 | 16 | 17 | 18 | 19 |
| Performance | Test sheet (L1) | Test sheet name | (L1-14) | (L1-15) | (L1-16) | (L1-17) | (L1-18) | (L1-19) |
| | | Decontamination property | B | B | B | B | B | C |
| | Test sheet (L2) | Test sheet name | (L2-14) | (L2-15) | (L2-16) | (L2-17) | (L2-18) | (L2-19) |
| | | Scratch resistance | C | B | C | A | C | A |
| | | Transparency | B | B | B | A | A | C |
| | Test sheet (L3) | Test sheet name | (L3-14) | (L3-15) | (L3-16) | (L3-17) | (L3-18) | (L3-19) |
| | | Decontamination property | B | B | B | B | B | C |
| | Test sheet (L4) | Test sheet name | (L4-14) | (L4-15) | (L4-16) | (L4-17) | (L4-18) | (L4-19) |
| | | Scratch resistance | C | B | C | A | C | A |
| | | Transparency | B | B | B | A | A | C |

TABLE 12-continued

|  |  | 40 | 41 | 42 | 43 | 44 | 45 |
|---|---|---|---|---|---|---|---|
| Test sheet (L5) | Test sheet name | (L5-14) | (L5-15) | (L5-16) | (L5-17) | (L5-18) | (L5-19) |
|  | Decontamination property | B | B | B | B | B | C |
| Test sheet (L6) | Test sheet name | (L6-14) | (L6-15) | (L6-16) | (L6-17) | (L6-18) | (L6-19) |
|  | Scratch resistance | C | B | C | A | C | A |
|  | Transparency | B | B | B | A | A | C |

TABLE 13

|  |  |  | 46 | 47 | 48 | 49 | 50 | 51 | 52 |
|---|---|---|---|---|---|---|---|---|---|
|  | Coating composition No. |  | 20 | 21 | 22 | 23 | 24 | 25 | 26 |
| Performance | Test sheet (L1) | Test sheet name | (L1-20) | (L1-21) | (L1-22) | (L1-23) | (L1-24) | (L1-25) | (L1-26) |
|  |  | Decontamination property | C | C | B | A | B | A | A |
|  | Test sheet (L2) | Test sheet name | (L2-20) | (L2-21) | (L2-22) | (L2-23) | (L2-24) | (L2-25) | (L2-26) |
|  |  | Scratch resistance | C | C | A | B | A | B | A |
|  |  | Transparency | B | A | A | A | B | A | B |
|  | Test sheet (L3) | Test sheet name | (L3-20) | (L3-21) | (L3-22) | (L3-23) | (L3-24) | (L3-25) | (L3-26) |
|  |  | Decontamination property | C | C | B | A | B | A | A |
|  | Test sheet (L4) | Test sheet name | (L4-20) | (L4-21) | (L4-22) | (L4-23) | (L4-24) | (L4-25) | (L4-26) |
|  |  | Scratch resistance | C | C | A | B | A | B | A |
|  |  | Transparency | B | A | A | A | B | A | B |
|  | Test sheet (L5) | Test sheet name | (L5-20) | (L5-21) | (L5-22) | (L5-23) | (L5-24) | (L5-25) | (L5-26) |
|  |  | Decontamination property | C | C | B | A | B | A | A |
|  | Test sheet (L6) | Test sheet name | (L6-20) | (L6-21) | (L6-22) | (L6-23) | (L6-24) | (L6-25) | (L6-26) |
|  |  | Scratch resistance | C | C | A | B | A | B | A |
|  |  | Transparency | B | A | A | A | B | A | B |

TABLE 14

|  |  |  | Comparative Examples ||||
|---|---|---|---|---|---|---|
|  |  |  | 5 | 6 | 7 | 8 |
|  | Coating composition No. |  | 27 | 28 | 29 | 30 |
| Performance | Test sheet (L1) | Test sheet name | (L1-27) | (L1-28) | (L1-29) | (L1-30) |
|  |  | Decontamination property | D | C | B | E |
|  | Test sheet (L2) | Test sheet name | (L2-27) | (L2-28) | (L2-29) | (L2-30) |
|  |  | Scratch resistance | B | D | D | D |
|  |  | Transparency | C | B | C | E |
|  | Test sheet (L3) | Test sheet name | (L3-27) | (L3-28) | (L3-29) | (L3-30) |
|  |  | Decontamination property | D | C | B | E |
|  | Test sheet (L4) | Test sheet name | (L4-27) | (L4-28) | (L4-29) | (L4-30) |
|  |  | Scratch resistance | B | D | D | D |
|  |  | Transparency | C | B | C | E |
|  | Test sheet (L5) | Test sheet name | (L5-27) | (L5-28) | (L5-29) | (L5-30) |
|  |  | Decontamination property | D | C | B | E |
|  | Test sheet (L6) | Test sheet name | (L6-27) | (L6-28) | (L6-29) | (L6-30) |
|  |  | Scratch resistance | B | D | D | D |
|  |  | Transparency | C | B | C | E |

The invention claimed is:

1. A coating composition comprising a resin with a hydroxyl group and an alkoxysilyl group (A), a curing agent (B) and a dispersion of acrylic resin- coated silica particles (C), wherein the dispersion of acrylic resin-coated silica particles (C) is a dispersion of acrylic resin-coated silica particles (C) that is the reaction product of silica particles with a polymerizable unsaturated group (c1) and a polymerizable unsaturated monomer mixture (c2), and the polymerizable unsaturated monomer mixture (c2) includes, as at least a portion of its components, a polymerizable unsaturated monomer having a polysiloxane structure (c21) represented by the following formula (I):

[Chemical Formula 1]

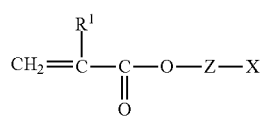

wherein $R^1$ represents a hydrogen atom or a methyl group, Z represents a structure including the following formula (II), and X represents a hydrogen atom or a (meth) acryloyl, alkyl, hydroxyl, amino, (alicyclic) epoxy, carboxyl, mercapto, vinyl, isocyanate or aryl group,

[Chemical Formula 2]

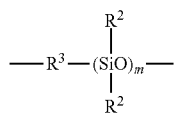

(II)

wherein m represents a number of 2 to 160, $R^2$ represent phenyl groups or alkyl groups of 1 to 6 carbon atoms, which may be the same or different, and $R^3$ represents an alkylene group of 1 to 6 carbon atoms, and an alkoxysilyl group-containing polymerizable unsaturated monomer (c22), wherein a proportion of the alkoxysilyl group-containing polymerizable unsaturated monomer (c22) in the polymerizable unsaturated monomer mixture (c2) is in a range of 15 mass % to 55 mass % with respect to a total amount of the polymerizable unsaturated monomer mixture (c2), and wherein the alkoxysilyl group-containing polymerizable unsaturated monomer (c22) is different in structure from the polymerizable unsaturated monomer having a polysiloxane structure (c21).

2. The coating composition according to claim 1, wherein the polymerizable unsaturated monomer mixture (c2) comprises a hydroxyl group-containing polymerizable unsaturated monomer.

3. The coating composition according to claim 1, wherein a number-average molecular weight of the polymerizable unsaturated monomer having a polysiloxane structure (c21) is in a range of 100 to 13,000.

4. The coating composition according to claim 2, wherein a hydroxyl value of the acrylic resin produced from the polymerizable unsaturated monomer mixture (c2) is in a range of 100 mgKOH/g to 200 mgKOH/g.

5. The coating composition according to claim 1, wherein a mass ratio of the silica particles with a polymerizable unsaturated group (c1) and the polymerizable unsaturated monomer mixture (c2) is in a range of (c1): (c2)=20/80 to 90/10.

6. The coating composition according to claim 1, wherein the dispersion of the acrylic resin-coated silica particles (C) comprises trimethyl orthoacetate.

7. The coating composition according to claim 1, wherein the curing agent (B) includes a polyisocyanate compound (B1).

8. The coating composition according to claim 1, wherein the resin with a hydroxyl group and an alkoxysilyl group (A) includes an acrylic resin having a hydroxyl group and an alkoxysilyl group (A1).

9. The coating composition according to claim 1, wherein the resin with a hydroxyl group and an alkoxysilyl group (A) does not have a polydimethylsiloxane structure.

10. A multilayer coating film-forming method, whereby a multilayer coating film is formed by applying at least one colored base coating material and least one clear coating material in that order on an article to be coated, wherein the coating composition according to claim 1, is applied as an uppermost clear coating material.

\* \* \* \* \*